(12) United States Patent
Bao et al.

(10) Patent No.: US 11,082,183 B2
(45) Date of Patent: Aug. 3, 2021

(54) COMB SHIFT DESIGN

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/006,432

(22) Filed: Aug. 28, 2020

(65) Prior Publication Data
US 2021/0083827 A1    Mar. 18, 2021

Related U.S. Application Data

(60) Provisional application No. 62/901,227, filed on Sep. 16, 2019.

(51) Int. Cl.
*H04L 5/00* (2006.01)
*H04W 72/04* (2009.01)
*H04J 11/00* (2006.01)

(52) U.S. Cl.
CPC ........ *H04L 5/0051* (2013.01); *H04J 11/0079* (2013.01); *H04W 72/048* (2013.01)

(58) Field of Classification Search
CPC . H04L 5/0051; H04L 5/0048; H04L 27/2613; H04L 27/2626; H04L 27/26; H04J 11/0079; H04W 72/048
See application file for complete search history.

(56) References Cited

U.S. PATENT DOCUMENTS

| 7,542,504 B2 | 6/2009 | Chang et al. |
| 8,000,273 B2 | 8/2011 | He et al. |
| 8,254,329 B2 | 8/2012 | Ko et al. |
| 8,254,344 B2 | 8/2012 | Akita et al. |

(Continued)

FOREIGN PATENT DOCUMENTS

| CN | 105164930 A | 12/2015 |
| EP | 2418887 A2 | 2/2012 |

(Continued)

OTHER PUBLICATIONS

Ericsson: "Downlink Positioning Solutions: Design and Evaluations", 3GPP Draft, 3GPP TSG RAN WG1 96, R1-1903139 DL Positioning Solutions, 3rd Generation Partnership Project (3GPP), Mobile Competence Centre, 650, Route Des Lucioles, F-06921 Sophia-Antipolis Cedex, France, vol. RAN WG1. No. Athens. Greece, Feb. 25, 2019-Mar. 1, 2019, Feb. 15, 2019 (Feb. 15, 2019), XP051600835, 28 Pages, Sections 1-5, figure 7.

(Continued)

Primary Examiner — Brian T O Connor
(74) Attorney, Agent, or Firm — MG-IP Law, P.C.

(57) ABSTRACT

Disclosed are techniques related to wireless communication. In an aspect, a sequence generating entity factorizes a comb size N into prime factors of N, and generates one or more offset sequences for a reference signal for positioning based on one or more sequence lists associated with the prime factors of N and a number of symbols M over which the reference signal is scheduled.

30 Claims, 25 Drawing Sheets

```
                                              ┌─700
# Initialization
For combsize N, do prime factor p_list = fpf(N);
P_lists = Unique(permutation(p_list));   #Find unique permutation of p_list
PRS_offsets = {};

# Main body – generate offset for each p_list (each list of prime factors)
For p_list in P_lists

# Generate offset sequence of length N
    PRSoffset = [0];
    For pNum in p_list
        templist = [];
        For s_i in primeseqlist(pNum);
            templist = [templist, pNum * PRSoffset + s_i];
        End
        PRSoffset = templist;
    End

# Extend or prune the offset list to symperPRS M
    if (combsize N < symperPRS M)
        extend PRSoffset to length M by repeat part of PRSoffset; # Note 1
    elseif (combsize N > symperPRS M)    # Note 2
        truncate PRSoffset to size M;
    End Add PRSoffset to PRS_offsets;
End

# Post processing – find all unique sequences & incorporate comb offset
PRS_offsets = Unique(PRS_offsets);
PRS_offsets = Shift(PRS_offsets, comb_offset J);    # If desired

# Note 1: The extension can be any consecutive subset [K, K+M-N] of PRSoffset.
#         where K is the starting point of offset sequence.
# Note 2: The truncation is not limited to the first M of PRSoffset.
#         It can be any consecutive subset [K, K+M] of PRSoffset.
#         where K is the starting point of offset sequence.
```

(56) References Cited

U.S. PATENT DOCUMENTS

| | | |
|---|---|---|
| 8,428,157 B2 | 4/2013 | Kakura et al. |
| 8,654,727 B2 | 2/2014 | Dai et al. |
| 8,675,752 B2 | 3/2014 | Lahtonen et al. |
| 8,718,001 B2 | 5/2014 | Zhang et al. |
| 8,750,870 B2 | 6/2014 | Palanki et al. |
| 8,855,068 B2 | 10/2014 | Qin et al. |
| 9,036,538 B2 | 5/2015 | Palanki |
| 9,326,283 B2 | 4/2016 | Shin et al. |
| 9,369,250 B2 | 6/2016 | Liu |
| 9,763,251 B2 | 9/2017 | Papasakellariou et al. |
| 9,794,039 B2 | 10/2017 | Kwak et al. |
| 9,814,015 B2 | 11/2017 | Xiao et al. |
| 9,913,239 B2 | 3/2018 | Tinnakornsrisuphap et al. |
| 10,021,667 B2 | 7/2018 | Akkarakaran et al. |
| 10,171,210 B2 | 1/2019 | Gong et al. |
| 10,333,670 B2 | 6/2019 | Rico Alvarino et al. |
| 10,736,074 B2 | 8/2020 | Edge et al. |
| 2003/0215035 A1 | 11/2003 | Amerga et al. |
| 2006/0128416 A1 | 6/2006 | Linebarger et al. |
| 2007/0002813 A1 | 1/2007 | Tenny et al. |
| 2011/0003551 A1 | 1/2011 | Kameno et al. |
| 2012/0021758 A1 | 1/2012 | Gum et al. |
| 2012/0252487 A1 | 10/2012 | Siomina et al. |
| 2013/0165052 A1 | 6/2013 | Chuang |
| 2013/0324154 A1 | 12/2013 | Raghupathy et al. |
| 2014/0349582 A1 | 11/2014 | Xiao et al. |
| 2015/0018010 A1 | 1/2015 | Fischer |
| 2015/0063228 A1 | 3/2015 | Aldana |
| 2015/0118678 A1 | 4/2015 | Mandecki et al. |
| 2015/0124673 A1 | 5/2015 | Ouchi et al. |
| 2015/0133173 A1 | 5/2015 | Edge et al. |
| 2015/0188678 A1 | 7/2015 | Wu et al. |
| 2015/0263837 A1 | 9/2015 | Patel et al. |
| 2015/0289311 A1 | 10/2015 | Chang et al. |
| 2015/0382205 A1 | 12/2015 | Lee et al. |
| 2016/0065342 A1 | 3/2016 | Mirbagheri et al. |
| 2016/0226647 A1 | 8/2016 | Wang et al. |
| 2017/0104517 A1 | 4/2017 | Kakishima et al. |
| 2017/0111880 A1 | 4/2017 | Park et al. |
| 2017/0180194 A1 | 6/2017 | Noh et al. |
| 2017/0238298 A1 | 8/2017 | Wang et al. |
| 2017/0288830 A1 | 10/2017 | Fischer |
| 2018/0097596 A1 | 4/2018 | Palanivelu et al. |
| 2018/0124787 A1 | 5/2018 | Wang et al. |
| 2018/0192404 A1 | 7/2018 | Maaref et al. |
| 2018/0198509 A1 | 7/2018 | Nilsson et al. |
| 2018/0217228 A1 | 8/2018 | Edge et al. |
| 2018/0295590 A1 | 10/2018 | Abedini et al. |
| 2019/0007152 A1 | 1/2019 | Yi et al. |
| 2019/0052443 A1 | 2/2019 | Cheng et al. |
| 2019/0053287 A1 | 2/2019 | Lin et al. |
| 2019/0068346 A1 | 2/2019 | Akkarakaran et al. |
| 2019/0159182 A1 | 5/2019 | Ranta-Aho et al. |
| 2019/0165913 A1 | 5/2019 | He et al. |
| 2019/0166514 A1 | 5/2019 | Liu |
| 2019/0178976 A1 | 6/2019 | Xiong et al. |
| 2019/0285722 A1 | 9/2019 | Markhovsky et al. |
| 2020/0036556 A1 | 1/2020 | Wei et al. |
| 2020/0052845 A1 | 2/2020 | Chuang et al. |
| 2020/0178202 A1 | 6/2020 | Edge et al. |
| 2020/0220676 A1 | 7/2020 | Xu et al. |
| 2020/0235877 A1 | 7/2020 | Manolakos et al. |
| 2020/0267718 A1* | 8/2020 | Park .................. H04L 5/0048 |
| 2020/0275416 A1* | 8/2020 | Haghighat .......... H04L 25/0204 |
| 2020/0313732 A1 | 10/2020 | Yang et al. |
| 2020/0313932 A1 | 10/2020 | Sun et al. |
| 2020/0336264 A1* | 10/2020 | Faxer .................. H04W 72/042 |
| 2020/0351045 A1 | 11/2020 | Manolakos |
| 2021/0021447 A1 | 1/2021 | Sun |
| 2021/0070451 A1 | 3/2021 | Manolakos et al. |

FOREIGN PATENT DOCUMENTS

| | | |
|---|---|---|
| EP | 2663144 A2 | 11/2013 |
| EP | 3041301 A1 | 7/2016 |
| EP | 3306337 A1 | 4/2018 |
| EP | 3490319 A1 | 5/2019 |
| WO | 2007022715 A1 | 3/2007 |
| WO | 2011085267 | 7/2011 |
| WO | 2013112972 A1 | 8/2013 |
| WO | 2013134724 | 9/2013 |
| WO | 2014131349 A1 | 9/2014 |
| WO | 2015027118 A1 | 2/2015 |
| WO | 2016155810 A1 | 10/2016 |
| WO | 2016164085 A1 | 10/2016 |
| WO | 2017040075 A1 | 3/2017 |
| WO | 2017048064 A1 | 3/2017 |
| WO | 2018126356 A1 | 7/2018 |
| WO | 2018127137 A1 | 7/2018 |
| WO | 2019000180 A1 | 1/2019 |
| WO | 2019212246 A1 | 11/2019 |
| WO | 2020001380 A1 | 1/2020 |
| WO | 2020145873 A1 | 7/2020 |

OTHER PUBLICATIONS

Ericsson: "Uplink Positioning Solutions: Design and Evaluations", 3GPP Draft, 3GPP TSG RAN WG1 #96, R1-1903140 UL Positioning Solutions, , 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019 (Feb. 15, 2019), XP051600836, 7 Pages, figure 1 p. 3-p. 4.

Indian Patent Application No. 201941012233, filed Mar. 28, 2019, 102 pages. (191994IN1).

Media Tek Inc: "Views on Potential Positioning Techniques", R1-1812373, 3GPP TSG-RAN WG1 Meeting #95, Spokane, USA, Nov. 12-Nov. 16, 2018, Date of Publication: Nov. 3, 2018, 6 pages, http://www.3gpp.Org/Ftp/Tsg_ran/WG1_RL1/TSGR1_95/Docs/R1-1812373.Zip.

Mediatek Inc: "On Downlink OTDOA and Angle based techniques", 3GPP TSG-RAN WG1 #96 Meeting, R1-1903239, Athens, Greece, Feb. 25,-MAr. 1, 2019, 8 Pages.

Mediatek Inc: "On downlink OTDOA Technique: Potential Reference Signal Design", 3GPP Draft, 3GPP TSG-RAN WG1 Ad-Hoc Meeting 1901, R1-1900203 On downlink OTDOA Technique_FINAL, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593127, 6 Pages, Sections 1-5, figures 4-5.

Mediatek Inc: "Reference Signal Design for NR Positioning", 3GPP Draft, 3GPP TSG-RAN WG1 #96 bis Meeting, R1-1904500 DL RS Design_Final, 3rd Generation Partnership Project (3GPP), Mobile Competence Centre , 650, Route Des Lucioles, F-06921 Sophia-Antipolis Cedex, France, vol. RAN WG1. No. Xi'an, China, Apr. 8, 2019-Apr. 12, 2019, Apr. 3, 2019 (Apr. 3, 2019), XP051707240, 24 Pages, Sections 1-4, figures 2e, 2f.

Nokia, et al., "Views on DL and UL Reference Signals for NR Positioning", 3GPP Draft, 3GPP TSG RAN WG1 #bis, R1-1905262 RS for NR Positioning, 3rd Generation Partnership Project (3GPP), Mobile Competence Centre, 650, Route Des Lucioles, F-06921 Sophia-Anti Polis Cedex, France, vol. RAN WG1, No. Xi'an, China, Apr. 8, 2019-Apr. 12, 2019, Apr. 2, 2019, (Apr. 2, 2019), XP051707399, 8 pages, Sections 1-3, figure 3.

Shin et al., "Sounding Reference Signal Measurement in LTE System", 18th International Conference on Advanced Communication Technology (ICACT), Mar. 3, 2016, pp. 755-758, https://ieeexplore.ieee.org/stamp/stamp.jsp?tp=&arnumber=7423548.

White Paper: "An overview of LTE Positioning", Feb. 2012, SPIRENT, 16 Pages.

CATT: "DL Reference Signals for NR Positioning", 3GPP TSG RAN WG1 #97, R1-1906305, Reno, USA, May 13-17, 2019, pp. 1-17.

ETSI TS 138 211 V15.2.0, "Physical Channels and Modulation", 5G, NR, 3GPP TS 38.211 version 15.2.0, Release 15, 2018, 98 Pages.

(56) References Cited

OTHER PUBLICATIONS

ETSI TS 138 211 V16.2.0, "Physical Channels and Modulation", 5G, NR, 3GPP TS 38.211, version 16.2.0, Release 16, Jul. 2020, pp. 1-135.
Fischer S., "Observed Time Difference of Arrival (OTDOA) Positioning in 3GPP LTE", Qualcomm Technologies Inc, Jun. 6, 2014 (Jun. 6, 2014), pp. 1-62, XP055284784, Retrieved from the Internet: URL: http://www.terranautx.com/s/Qualcomm-OTDOA-positioning-in-LTE-June-2014.pdf, p. 9, chapter 3.1;p. 13, chapter 4.2.1;p. 15, chapter 5.1;p. 18, chapter 5.4;pp. 31-33, chapter 6.3;pp. 37-39, chapter 6.5; pp. 40-42, chapters 7.1.1-7.1.3.
Huawei, et al., "Downlink Based Solutions for NR Positioning", 3GPP Draft, R1-1900036, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051592962, 7 pages, Retrieved from the Internet: URL: http://www.3gpp.org/ftp/Meetings%5F3GPP%5FSYNC/RAN1/Docs/R1%2D1900036%2Ezip. [retrieved on Jan. 20, 2019] the whole document.
Intel Corporation: "DL Reference Signals for NR Positioning", 3GPP Draft; R1-1908659 Intel—NRPOS DLRS, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765267, 27 pages, Retrieved from the Internet: URL: http://www.3gpp.org/ftp/tsg_ran/WG1_RL1/TSGR1_98/Docs/R1-1908659.zip. [retrieved on Aug. 17, 2019] the whole document.
Intel Corporation: "Offline Discussion Outcome on DL Reference Signals for NR", 3GPP TSG RAN WG1 Meeting #96bis, R1-1905847, Xi'an, China, Apr. 8-12, 2019, pp. 1-12.
LG Electronics: "Discussion on Potential Enhancements for Indoor Positioning", 3GPP Draft, R1-150229 Discussion on potential enhancements for indoor positioning, 3rd Generation Partnership Project (3GPP), vol. RAN WG1, Athens, Greece; Feb. 8, 2015, pp. 1-4, XP050933443, retrieved from the Internet: URL: http://www.3gpp.org/ftp/Meetings_3GPP_SYNC/RAN1/Docs/.
NEXTNAV: "Synchronization for OTDOA Simulations", R1-150691, 3GPP TSG RAN WG1 Meeting #80, Athens, Greece, Feb. 9-13, 2015, 3 Pages.
VIVO: "Discussion on DL RS for NR Positioning", R1-1908174, 3GPP TSG RAN WG1 #98, Prague, CZ, Aug. 26-30, 2019, 13 Pages.
Ericsson: "RAT Dependent NR Positioning Solutions", 3GPP Draft, 3GPP TSG-RAN WG1 #95, R1-1813592, RAT Dependent NR Positioning Solutions, 3rd Generation Partnership Project (3GPP), Mobile Competence Centre, 650, Route Des Lucioles, F-06921, Sophia-Antipolis Cedex, France, vol. RAN WG1. No. Spokane. United States, Nov. 12, 2018-Nov. 16, 2018, Nov. 11, 2018 (Nov. 11, 2018), XP051555648, 17 pages, p. 7-p. 15.
International Search Report and Written Opinion—PCT/US2020/048793—ISA/EPO—dated Mar. 1, 2021.
Keating R., et al., "Overview of Positioning in 5G New Radio", 2019 16th International Symposium on Wireless Communication Systems (ISWCS), IEEE, Aug. 27, 2019 (Aug. 27, 2019), pp. 320-324. XP033636268, DOI: 10.1109/ISWCS.2019.8877160 [retrieved on Oct. 28, 2019] p. 323-p. 324.
Partial International Search Report—PCT/US2020/048793—ISA/EPO—dated Nov. 24, 2020.

* cited by examiner

```
# Initialization
For combsize N, do prime factor p_list = fpf(N);
P_lists = Unique(permutation(p_list));    #Find unique permutation of p_list
PRS_offsets = {};

# Main body – generate offset for each p_list (each list of prime factors)
For p_list in P_lists

# Generate offset sequence of length N
        PRSoffset = [0];
        For pNum in p_list
                templist = [];
                For s_i in primeseqlist(pNum);
                        templist = [templist, pNum * PRSoffset + s_i];
                End
                PRSoffset = templist;
        End

# Extend or prune the offset list to symperPRS M
        if (combsize N < symperPRS M)
                extend PRSoffset to length M by repeat part of PRSoffset; # Note 1
        elseif (combsize N > symperPRS M)       # Note 2
                truncate PRSoffset to size M;
        End Add PRSoffset to PRS_offsets;
End

# Post processing – find all unique sequences & incorporate comb offset
PRS_offsets = Unique(PRS_offsets);
PRS_offsets = Shift(PRS_offsets, comb_offset J);     # If desired

# Note 1: The extension can be any consecutive subset [K, K+M-N] of PRSoffset.
#         where K is the starting point of offset sequence.
# Note 2: The truncation is not limited to the first M of PRSoffset.
#         It can be any consecutive subset [K, K+M] of PRSoffset.
#         where K is the starting point of offset sequence.
```

FIG. 7

```

# Generate offset sequence O based on: N, M, S, K where
#      N represents the comb size,
#      M represents the number of PRS symbols (e.g., per slot),
#      S represents the step size (can default to 1), and
#      K represents initial tone offset (can default to 0 or some random integer)
# The length of offset sequence is M.  S and N chosen to provide an even
# distribution within subcarriers.
#      Offset sequence O = [O_0, O_1, ... , O_m, ... , O_{M-1}]

# Initialize Set first sequence value to initial tone offset K
O_0 = K;        # can default to 0 or some random value if not specified

# Main body – iteratively generate sequence values
For m=1 to M-1
       O_m = mod(S + O_{m-1}, N);
End
PRSoffset = [O_0, O_1, ... , O_m, ... , O_{M-1}]

# Post processing
PRSoffset = mod(Shift(PRSoffset, comb_offset J), N); # If desired
```

*FIG. 11*

COMB SHIFT DESIGN

CROSS-REFERENCE TO RELATED APPLICATIONS

The present application for patent claims the benefit of U.S. Provisional Application No. 62/901,227, entitled "COMB SHIFT DESIGN," filed Sep. 16, 2019, assigned to the assignee hereof, and expressly incorporated herein by reference in its entirety.

BACKGROUND OF THE DISCLOSURE

1. Field of the Disclosure

Various aspects described herein generally relate to wireless communication systems, and more particularly, to comb shift design, e.g., for offset sequence generation for transmission of reference signals.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a sequence generating entity includes factorizing a comb size N into prime factors of N, and generating one or more offset sequences for a reference signal for positioning based on one or more sequence lists associated with the prime factors of N and a number of symbols M over which the reference signal is scheduled.

In an aspect, a method for wireless communication at a base station includes identifying a reference signal configuration for transmission of a reference signal for positioning to a user equipment (UE), the reference signal configuration providing reference signal resources within at least a first orthogonal frequency division multiplexing (OFDM) symbol, a second OFDM symbol, a third OFDM symbol, a fourth OFDM symbol, a fifth OFDM symbol, a sixth OFDM symbol, a seventh OFDM symbol, an eighth OFDM symbol, a ninth OFDM symbol, a tenth OFDM symbol, an eleventh OFDM symbol, and a twelfth OFDM symbol, and transmitting to the UE, based at least in part on the reference signal configuration, a first portion of the DL-PRS on a first subset of frequency resources of the first OFDM symbol, a second portion of the DL-PRS on a second subset of frequency resources of the second OFDM symbol, a third portion of the DL-PRS on a third subset of frequency resources of the third OFDM symbol, a fourth portion of the DL-PRS on a fourth subset of frequency resources of the fourth OFDM symbol, a fifth portion of the DL-PRS on a fifth subset of frequency resources of the fifth OFDM symbol, a sixth portion of the DL-PRS on a sixth subset of frequency resources of the sixth OFDM symbol, a seventh portion of the DL-PRS on a seventh subset of frequency resources of the seventh OFDM symbol, an eighth portion of the DL-PRS on an eighth subset of frequency resources of the eighth OFDM symbol, a ninth portion of the DL-PRS on a ninth subset of frequency resources of the ninth OFDM symbol, a tenth portion of the DL-PRS on a tenth subset of frequency resources of the tenth OFDM symbol, an eleventh portion of the DL-PRS on an eleventh subset of frequency resources of the eleventh OFDM symbol, and a twelfth portion of the DL-PRS on a twelfth subset of frequency resources of the twelfth OFDM symbol.

In an aspect, a sequence generating entity includes a memory and at least one processor communicatively coupled to the memory, the at least one processor configured to: factorize a comb size N into prime factors of N, and generate one or more offset sequences for a reference signal for positioning based on one or more sequence lists associated with the prime factors of N and a number of symbols M over which the reference signal is scheduled.

In an aspect, a base station includes a memory, at least one transceiver, and at least one processor communicatively coupled to the memory and the at least one transceiver, the at least one processor configured to: identify a reference signal configuration for transmission of a DL-PRS to a user equipment (UE), the reference signal configuration providing reference signal resources within at least a first OFDM symbol, a second OFDM symbol, a third OFDM symbol, a fourth OFDM symbol, a fifth OFDM symbol, a sixth OFDM symbol, a seventh OFDM symbol, an eighth OFDM symbol, a ninth OFDM symbol, a tenth OFDM symbol, an eleventh OFDM symbol, and a twelfth OFDM symbol, and cause the at least one transceiver to transmit, to the UE, based at least in part on the reference signal configuration, a first portion of the DL-PRS on a first subset of frequency resources of the first OFDM symbol, a second portion of the DL-PRS on a second subset of frequency resources of the second OFDM symbol, a third portion of the DL-PRS on a third subset of frequency resources of the third OFDM symbol, a fourth portion of the DL-PRS on a fourth subset of frequency resources of the fourth OFDM symbol, a fifth portion of the DL-PRS on a fifth subset of frequency resources of the fifth OFDM symbol, a sixth portion of the DL-PRS on a sixth subset of frequency resources of the sixth OFDM symbol, a seventh portion of the DL-PRS on a seventh subset of frequency resources of the seventh OFDM symbol, an eighth portion of the DL-PRS on an eighth subset of frequency resources of the eighth OFDM symbol, a ninth portion of the DL-PRS on a ninth subset of frequency resources of the ninth OFDM symbol, a tenth portion of the DL-PRS on a tenth subset of frequency resources of the tenth OFDM symbol, an eleventh portion of the DL-PRS on an eleventh subset of frequency resources of the eleventh OFDM symbol, and a twelfth portion of the DL-PRS on a twelfth subset of frequency resources of the twelfth OFDM symbol.

In an aspect, a sequence generating entity includes means for factorizing a comb size N into prime factors of N, and means for generating one or more offset sequences for a reference signal for positioning based on one or more sequence lists associated with the prime factors of N and a number of symbols M over which the reference signal is scheduled.

In an aspect, a base station includes means for identifying a reference signal configuration for transmission of a reference signal for positioning to a user equipment (UE), the reference signal configuration providing reference signal resources within at least a first OFDM symbol, a second OFDM symbol, a third OFDM symbol, a fourth OFDM symbol, a fifth OFDM symbol, a sixth OFDM symbol, a seventh OFDM symbol, an eighth OFDM symbol, a ninth OFDM symbol, a tenth OFDM symbol, an eleventh OFDM symbol, and a twelfth OFDM symbol, and means for transmitting to the UE, based at least in part on the reference signal configuration, a first portion of the DL-PRS on a first subset of frequency resources of the first OFDM symbol, a second portion of the DL-PRS on a second subset of frequency resources of the second OFDM symbol, a third portion of the DL-PRS on a third subset of frequency resources of the third OFDM symbol, a fourth portion of the DL-PRS on a fourth subset of frequency resources of the fourth OFDM symbol, a fifth portion of the DL-PRS on a fifth subset of frequency resources of the fifth OFDM symbol, a sixth portion of the DL-PRS on a sixth subset of frequency resources of the sixth OFDM symbol, a seventh portion of the DL-PRS on a seventh subset of frequency resources of the seventh OFDM symbol, an eighth portion of the DL-PRS on an eighth subset of frequency resources of the eighth OFDM symbol, a ninth portion of the DL-PRS on a ninth subset of frequency resources of the ninth OFDM symbol, a tenth portion of the DL-PRS on a tenth subset of frequency resources of the tenth OFDM symbol, an eleventh portion of the DL-PRS on an eleventh subset of frequency resources of the eleventh OFDM symbol, and a twelfth portion of the DL-PRS on a twelfth subset of frequency resources of the twelfth OFDM symbol.

In an aspect, a non-transitory computer-readable medium storing computer-executable instructions includes computer-executable instructions comprising at least one instruction instructing a sequence generating entity to factorize a comb size N into prime factors of N, and at least one instruction instructing the sequence generating entity to generate one or more offset sequences for a reference signal for positioning based on one or more sequence lists associated with the prime factors of N and a number of symbols M over which the reference signal is scheduled.

In an aspect, a non-transitory computer-readable medium storing computer-executable instructions includes computer-executable instructions comprising at least one instruction instructing a base station to identify a reference signal configuration for transmission of a DL-PRS to a user equipment (UE), the reference signal configuration providing reference signal resources within at least a first OFDM symbol, a second OFDM symbol, a third OFDM symbol, a fourth OFDM symbol, a fifth OFDM symbol, a sixth OFDM symbol, a seventh OFDM symbol, an eighth OFDM symbol, a ninth OFDM symbol, a tenth OFDM symbol, an eleventh OFDM symbol, and a twelfth OFDM symbol, and at least one instruction instructing the base station to transmit to the UE, based at least in part on the reference signal configuration, a first portion of the DL-PRS on a first subset of frequency resources of the first OFDM symbol, a second portion of the DL-PRS on a second subset of frequency resources of the second OFDM symbol, a third portion of the DL-PRS on a third subset of frequency resources of the third OFDM symbol, a fourth portion of the DL-PRS on a fourth subset of frequency resources of the fourth OFDM symbol, a fifth portion of the DL-PRS on a fifth subset of frequency resources of the fifth OFDM symbol, a sixth portion of the DL-PRS on a sixth subset of frequency resources of the sixth OFDM symbol, a seventh portion of the DL-PRS on a seventh subset of frequency resources of the seventh OFDM symbol, an eighth portion of the DL-PRS on an eighth subset of frequency resources of the eighth OFDM symbol, a ninth portion of the DL-PRS on a ninth subset of frequency resources of the ninth OFDM symbol, a tenth portion of the DL-PRS on a tenth subset of frequency resources of the tenth OFDM symbol, an eleventh portion of the DL-PRS on an eleventh subset of frequency resources of the eleventh OFDM symbol, and a twelfth portion of the DL-PRS on a twelfth subset of frequency resources of the twelfth OFDM symbol.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 7 illustrates an example algorithm of generating offset sequences for comb patterns, according to aspects of the disclosure;

FIG. 11 illustrates another example algorithm of generating offset sequences for comb patterns, according to aspects of the disclosure;

DETAILED DESCRIPTION

Figure 1:
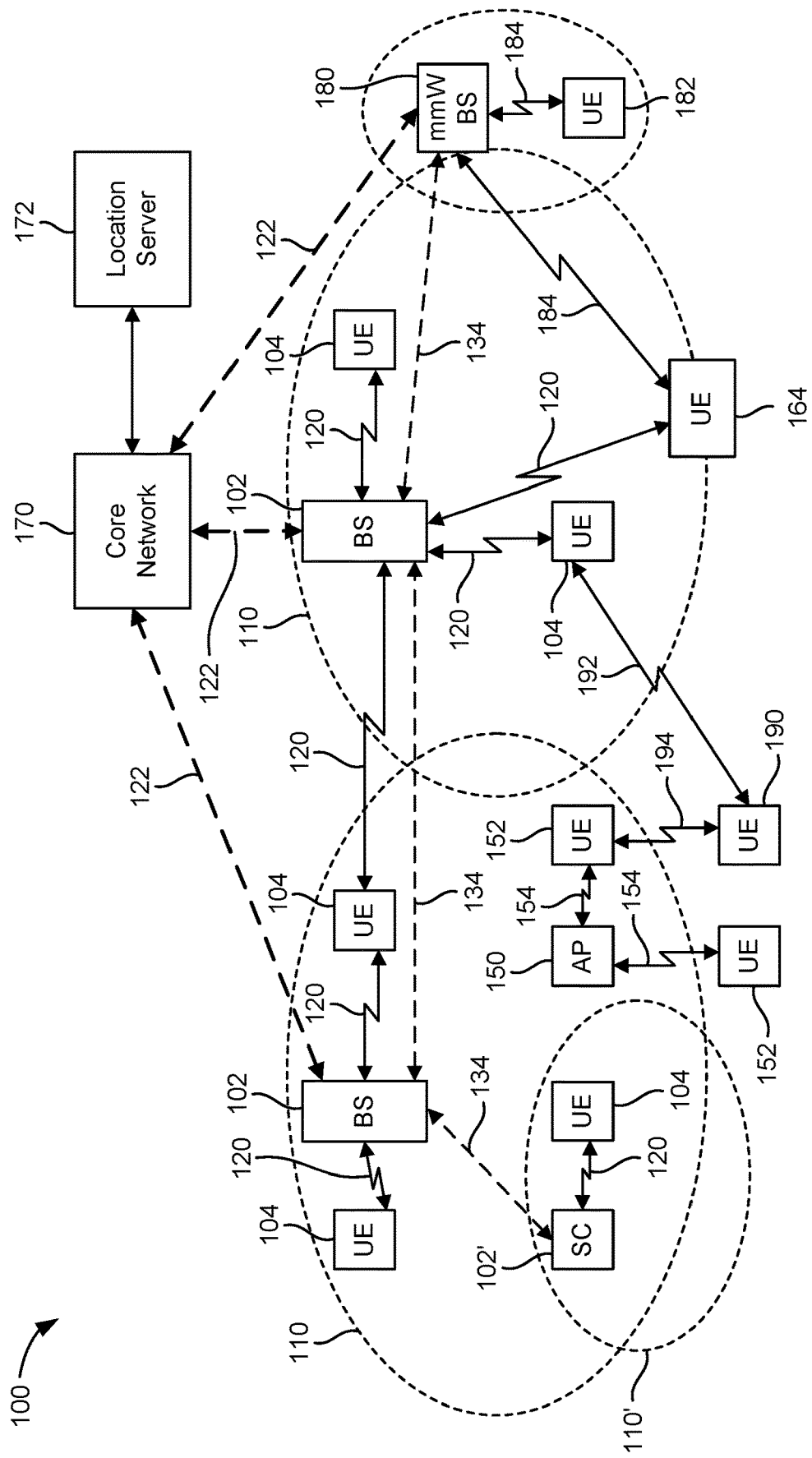
FIG. 1 illustrates an exemplary wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/

182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
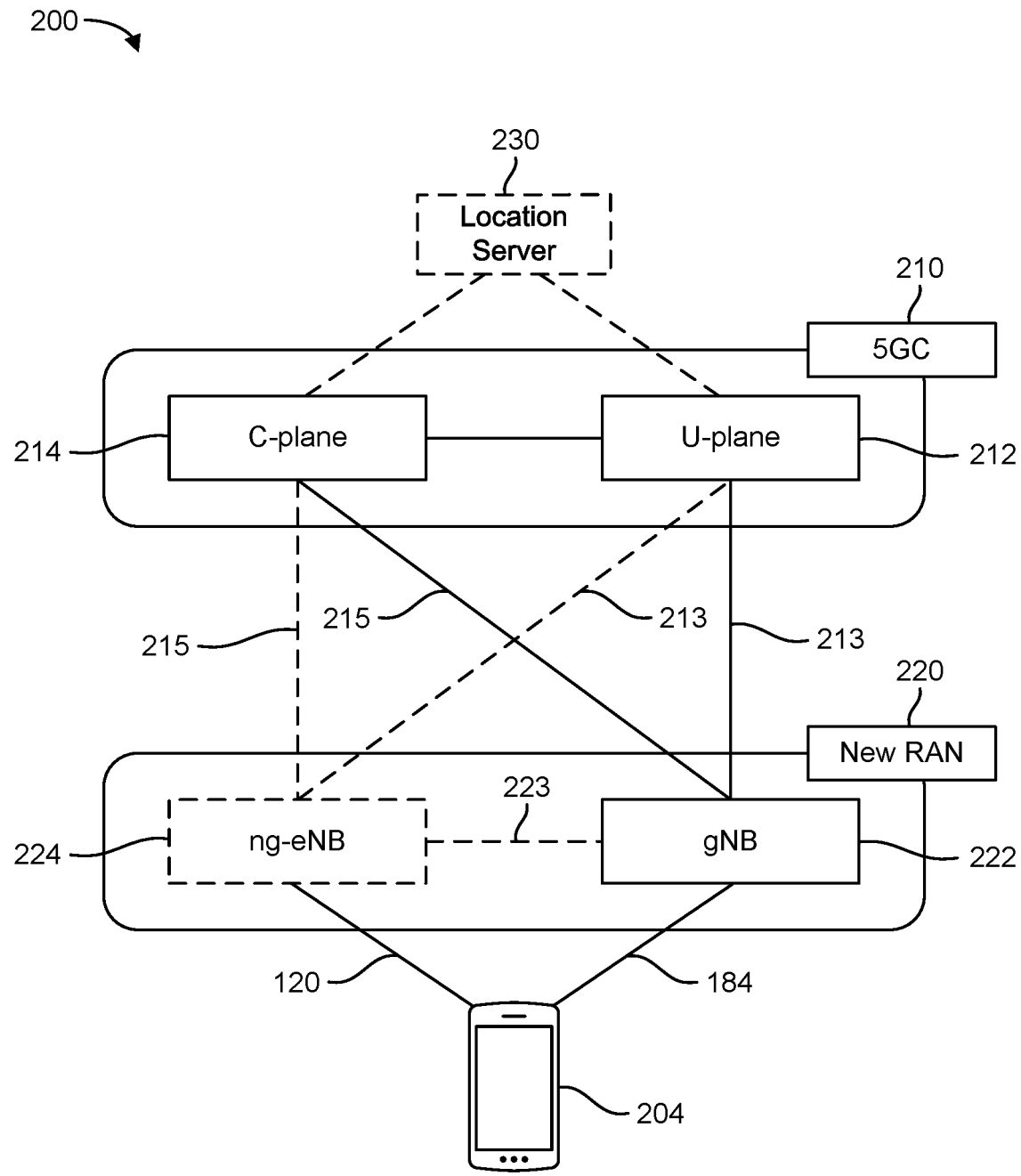
FIGS. 2A and 2B illustrate example wireless network structures, according to aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
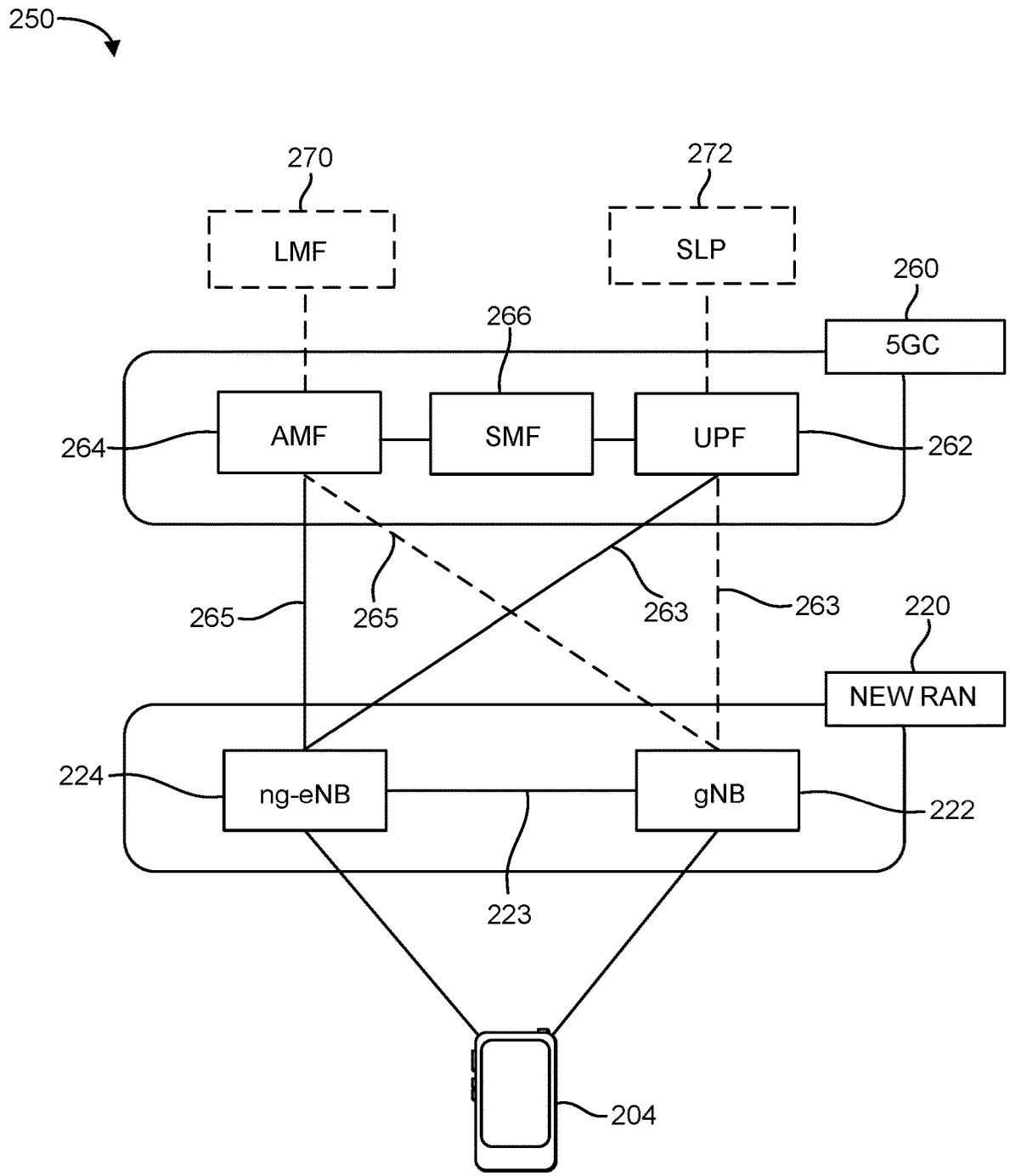

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
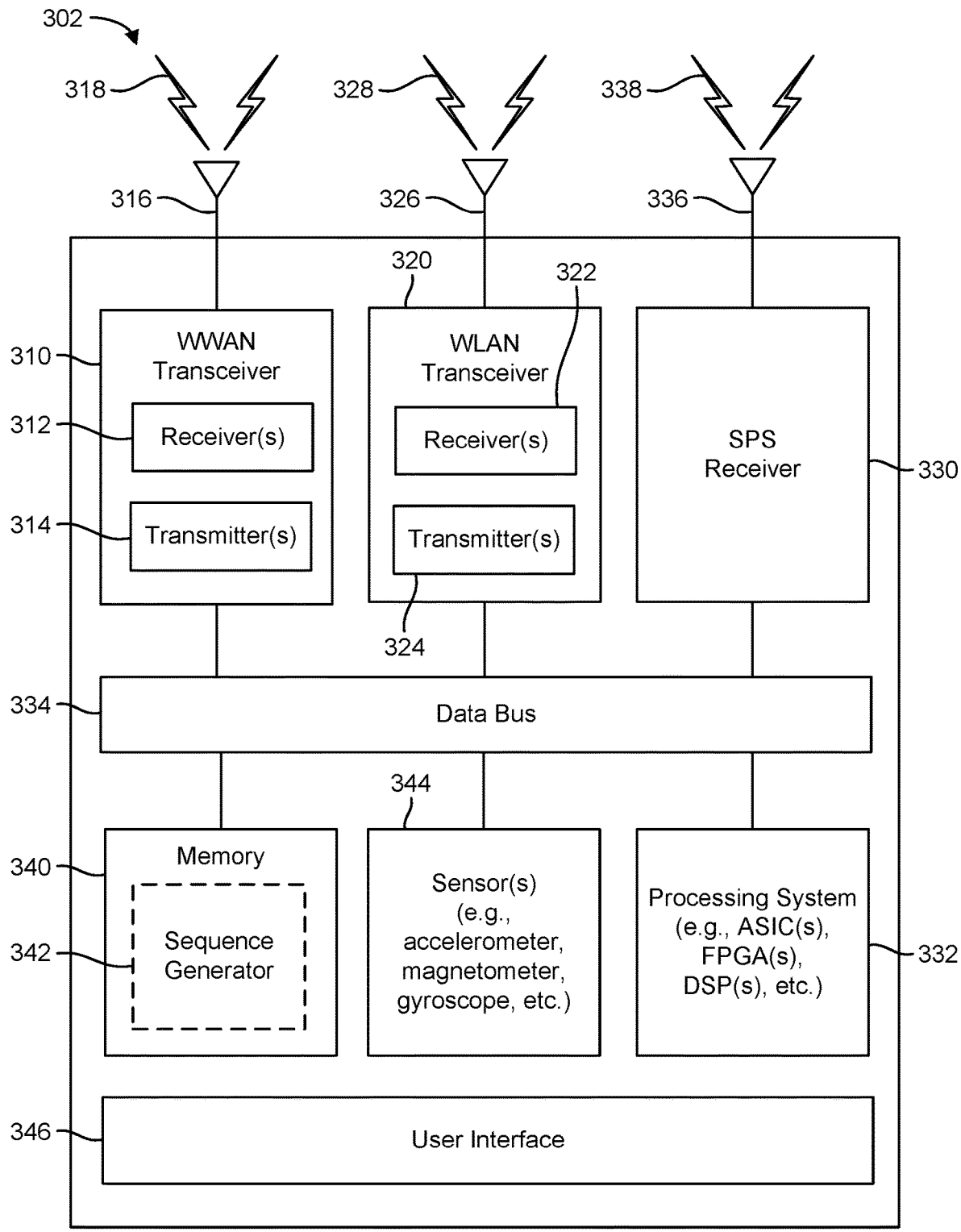
FIGS. 3A to 3C are simplified block diagrams of several sample aspects of components that may be employed in a UE, a base station, and a network entity, respectively.
Figure 3B:
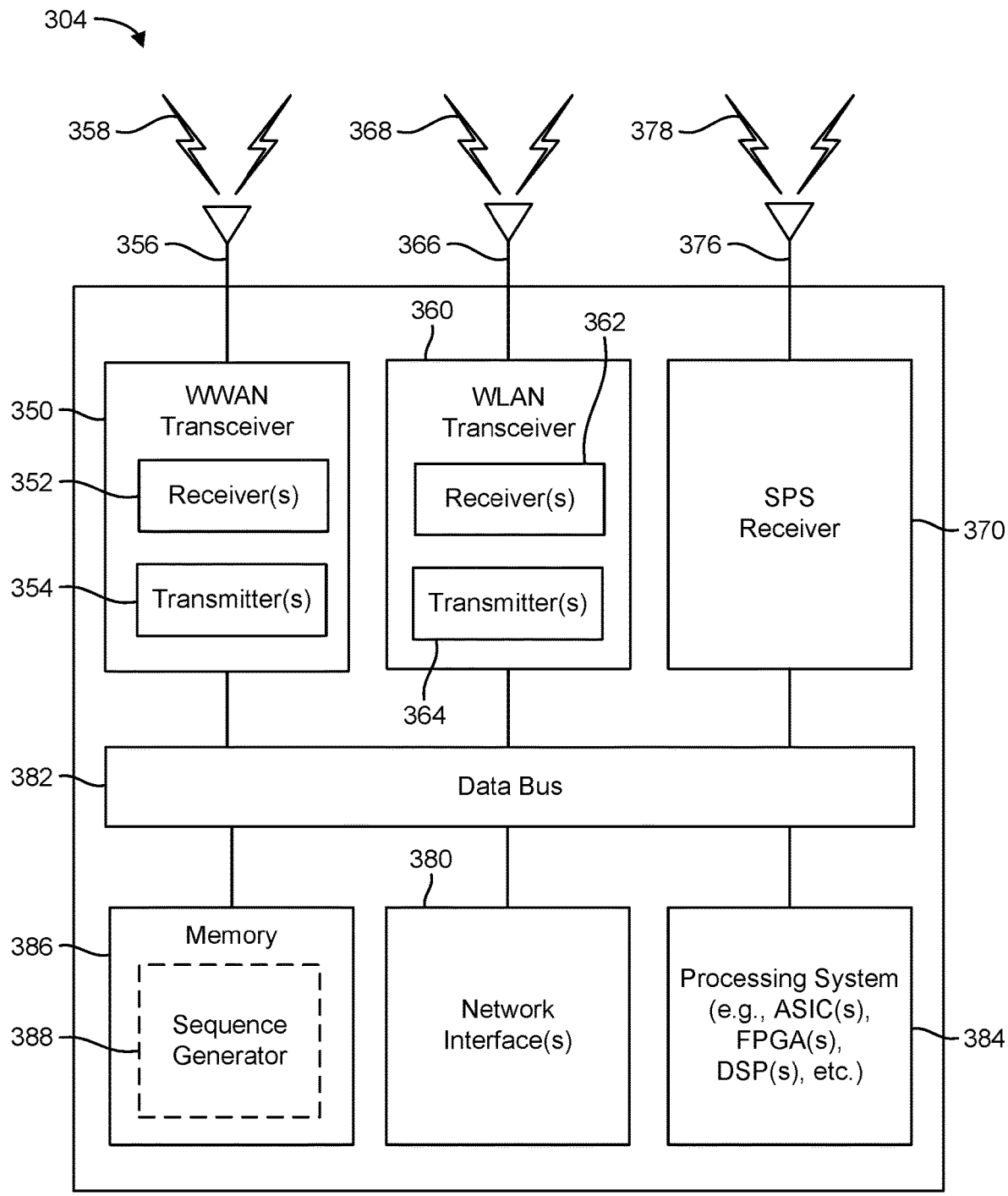
Figure 3C:
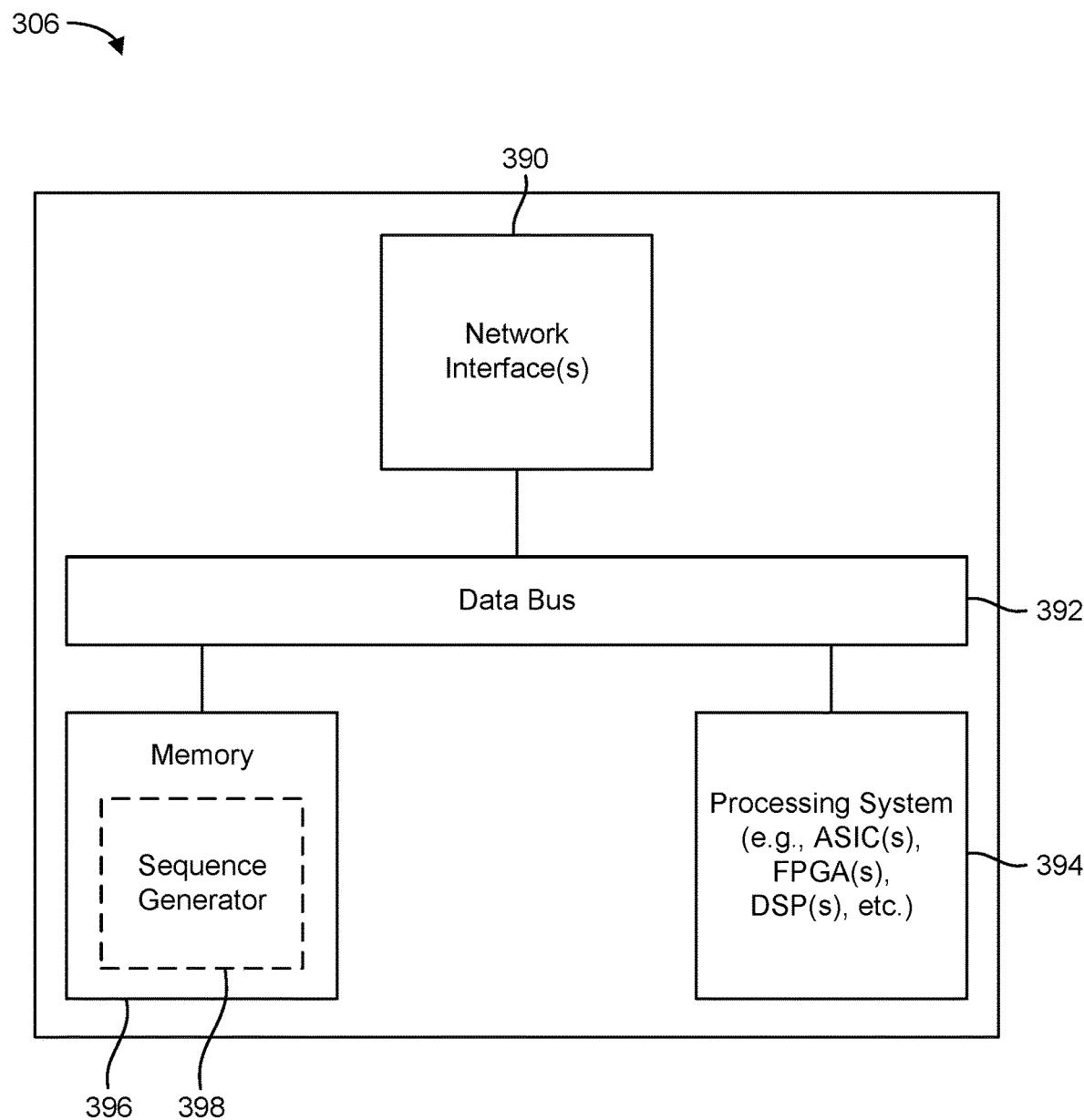

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include sequence generators 342, 388, and 398, respectively. The sequence generators 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the sequence generators 342, 388, and 398 may be external to the processing systems 332, 384, and 394 (e.g., part of a modem processing system, integrated with another processing system, etc.). Alternatively, the sequence generators 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the sequence generators 342, 388, and 398, etc.

Figure 4A:
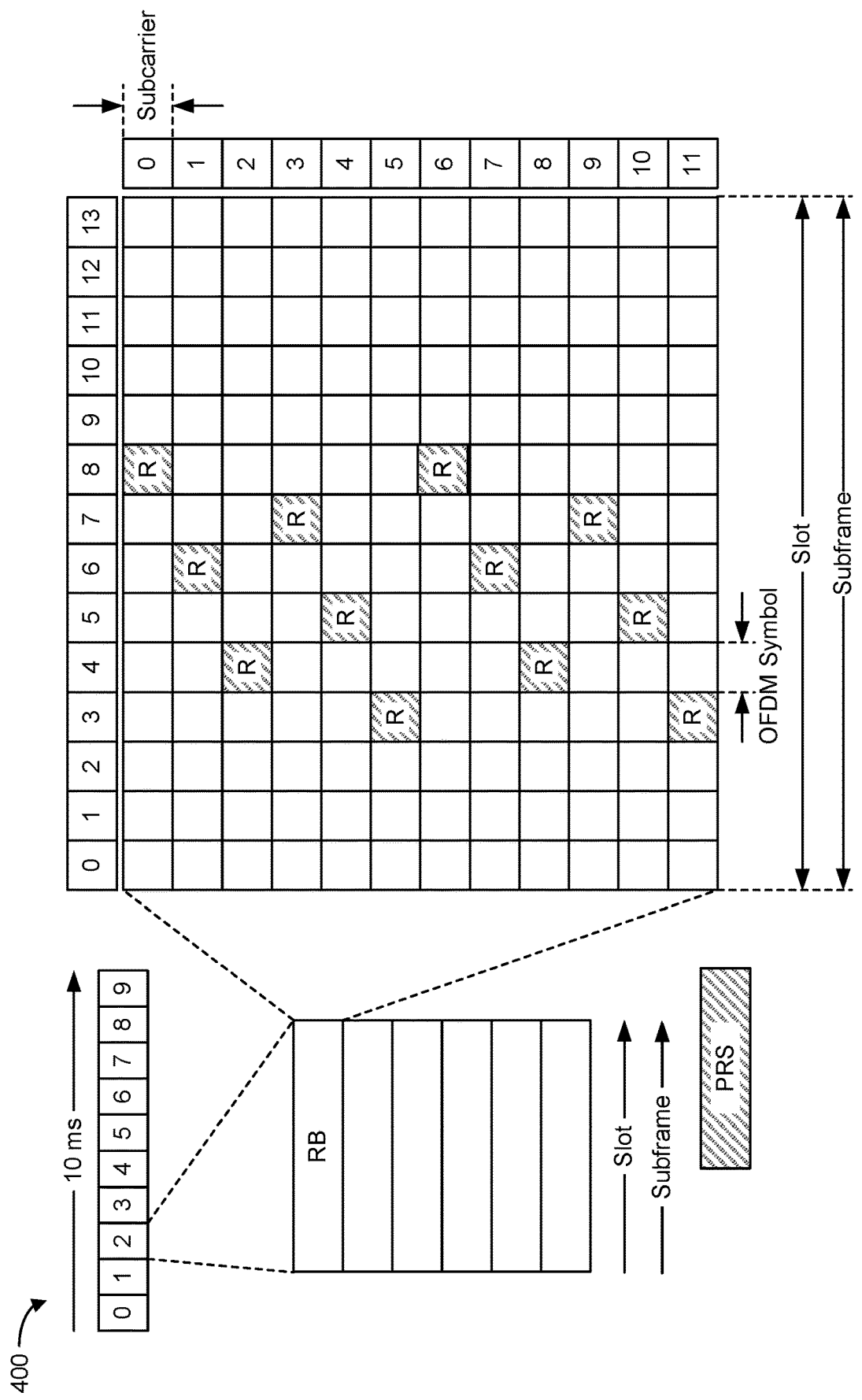
FIGS. 4A to 4D are diagrams illustrating examples of frame structures and channels within the frame structures, according to aspects of the disclosure.
Figure 4B:
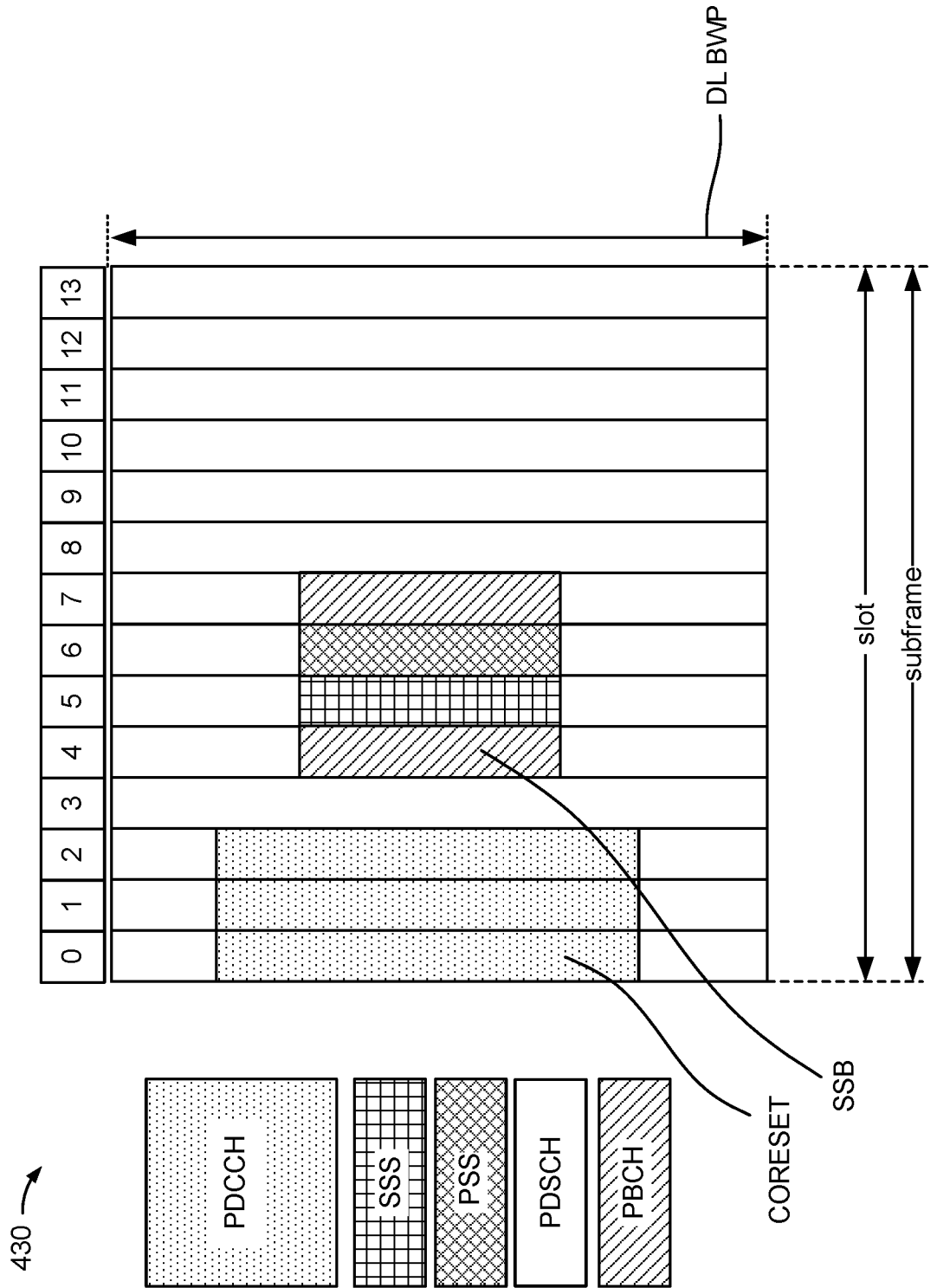
Figure 4C:
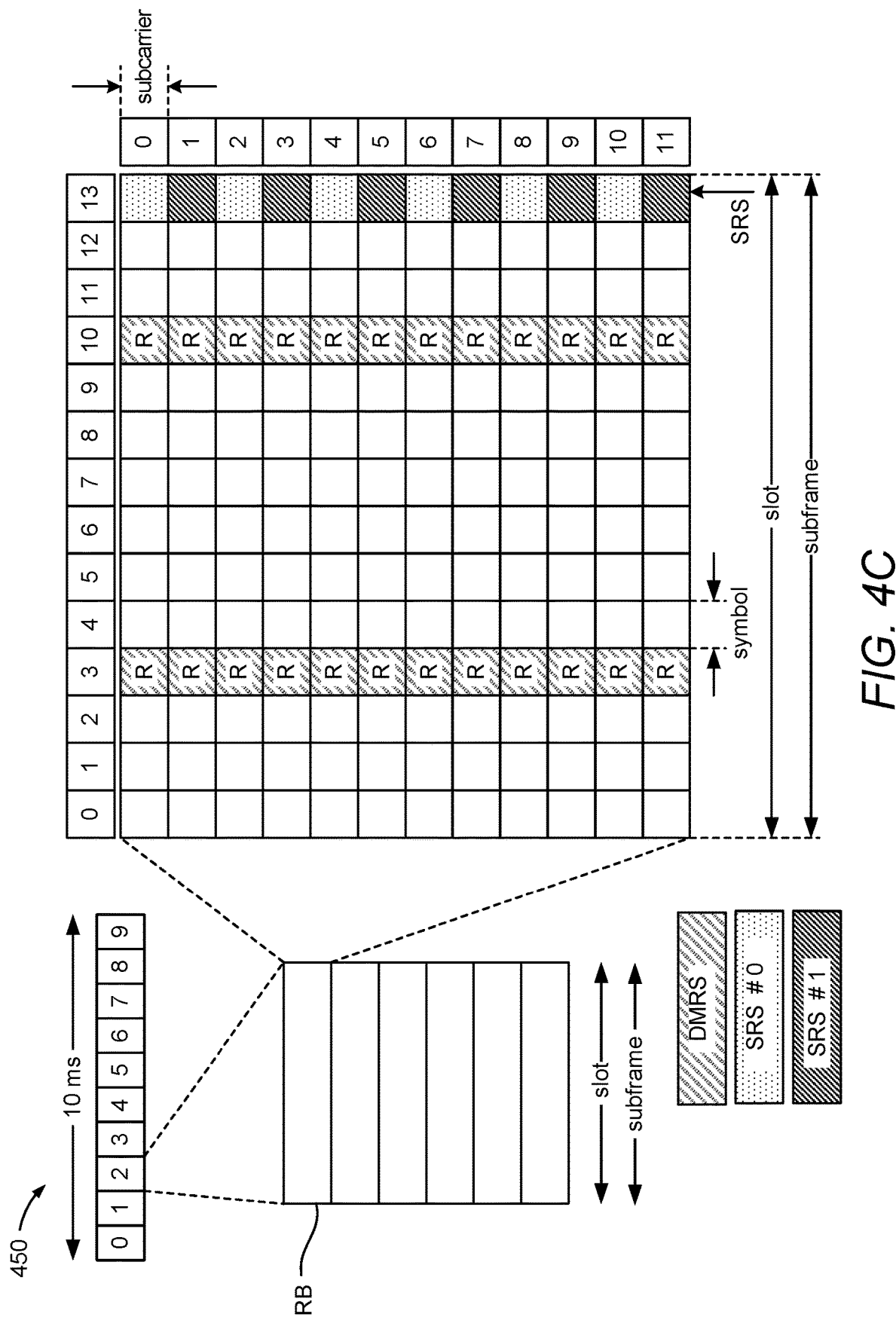
Figure 4D:
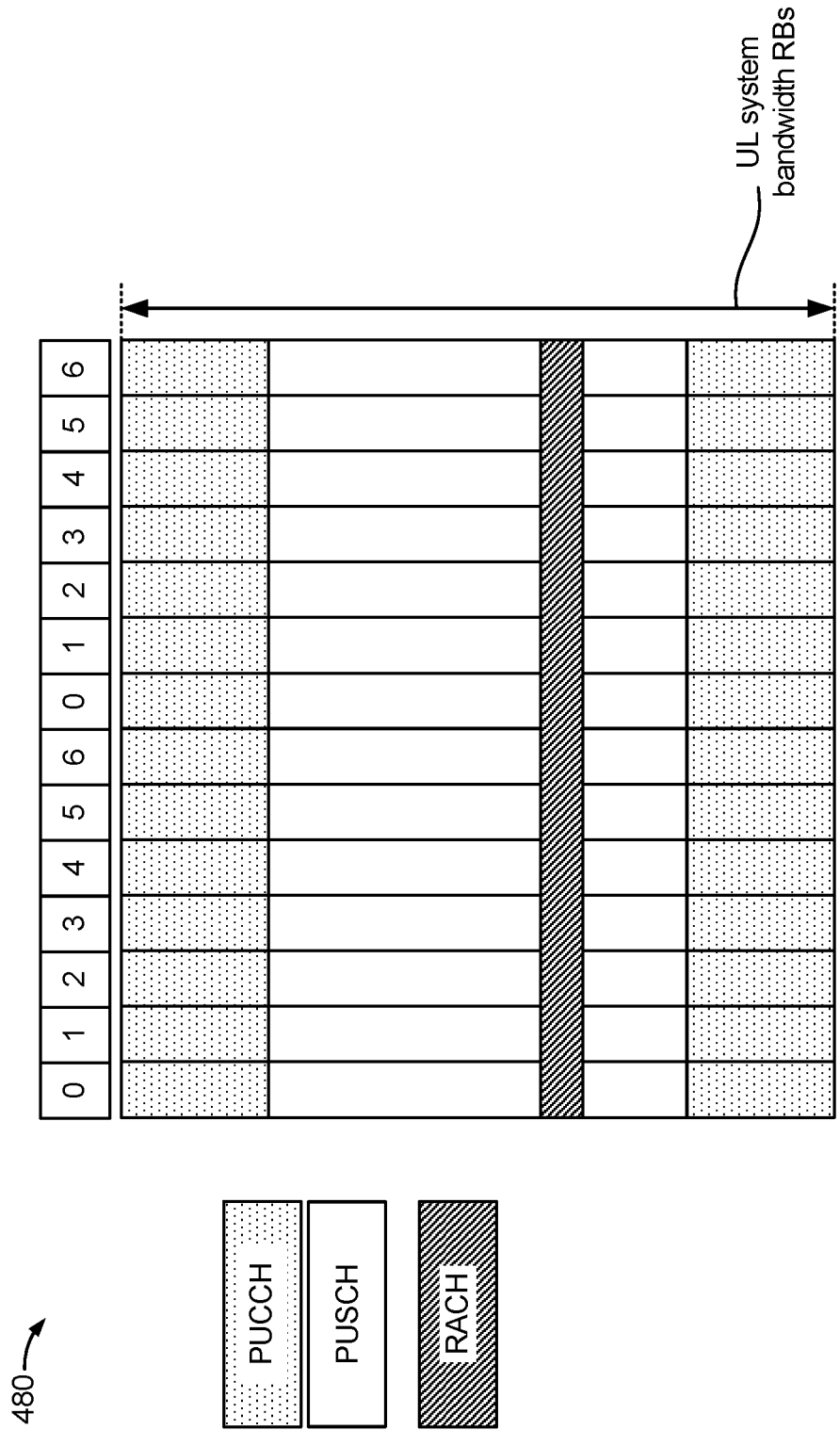

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Sot | Slots/ Sub-frame | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates exemplary locations of REs carrying PRS (labeled "R").

A collection of resource elements (REs) that are used for transmission of PRS is referred to as a "PRS resource." The collection of resource elements can span multiple PRBs in the frequency domain and 'M' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fours symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu$=0, 1, 2, 3. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

FIG. 4B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

As illustrated in FIG. 4C, some of the REs carry DMRS for channel estimation at the base station. The UE may additionally transmit SRS in, for example, the last symbol of a subframe. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 4C, the illustrated SRS are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 4D illustrates an example of various channels within an uplink subframe of a frame, according to aspects of the disclosure. A random access channel (RACH), also referred to as a physical random access channel (PRACH), may be within one or more subframes within a frame based on the PRACH configuration. The PRACH may include six consecutive RB pairs within a subframe. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS can also be used as uplink positioning reference signals for uplink positioning procedures, such as uplink time-difference of arrival (UL-TDOA), multi-round-trip-time (multi-RTT), downlink angle-of-arrival (DL-AoA), etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters SpatialRelationInfo and PathLoss-Reference are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There may also be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS, TRS, PTRS, CRS, CSI-RS, DMRS, PSS, SSS, SSB, SRS, UL-PRS, etc. In addition, the terms "positioning reference signal" and "PRS" refer to downlink or uplink positioning reference signals, unless otherwise indicated. A downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

PRS, and other types of positioning reference signals, are used for a number of cellular network-based positioning technologies. Such positioning technologies include downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, PTRS, CSI-RS, SSB, etc.) received from pairs of base stations, referred to as reference signal time difference (RSTD) or time difference of arrival (TDOA) measurements, and reports them to a positioning entity (e.g., the UE, a location server, a serving base station, or other network component). More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5A:
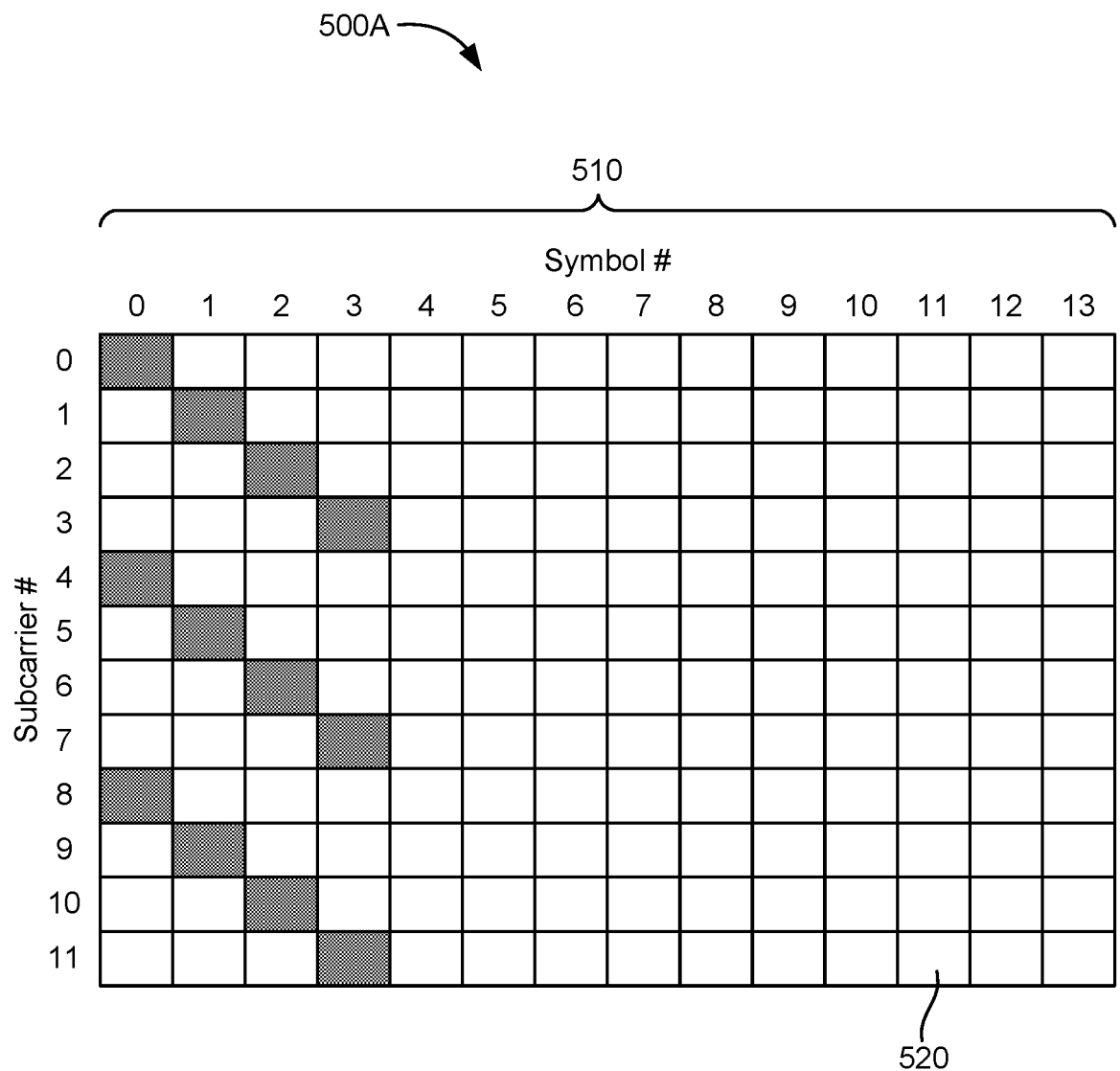
FIGS. 5A to 5C illustrate examples of comb patterns, according to aspects of the disclosure.

As described above, positioning reference signals (uplink or downlink) are mapped to specific REs within a slot. FIG. 5A illustrates an example of a signal pattern 500A, also referred to as a comb pattern, for transmitting reference signals for positioning (e.g., PRS, SRS). In FIG. 5A, a resource set 510 is configured with the signal pattern 500A. The resource set 510 comprises REs 520 arranged in rows and columns. Each row represents a subcarrier (or tone) and each column represents a symbol. The resource set 510 is an example of a PRB.

In the signal pattern 500A, the REs 520 of the resource set 510 used to transmit the reference signals for positioning are shaded. Thus, the pattern of the shaded REs 520 represents the signal pattern 500A. The shaded REs 520 represent the portion of a PRS resource (or an SRS resource) within the resource set 510. The signal pattern 500A is an example of a comb-4 pattern (N=4) over four symbols (M=4). Thus, for the first symbol (symbol '0'), REs 520 corresponding to every fourth subcarrier (subcarriers '0,' '4,' '8') is used to transmit the reference signal. Similarly, for the second symbol (symbol '1'), again, every fourth subcarrier is used to transmit the reference signal, and so on. The difference from symbol to symbol is that the starting subcarrier is offset by one subcarrier.

A sequence of comb offsets (or subcarrier/tone offsets) can be used to characterize the signal pattern 500A, and thus, can be used to map the reference signal to the resource set 510. The sequence of comb offsets—also referred to as the offset sequence—may be determined from the (same) topmost shaded RE 520 within each symbol, RE 520 corresponding to a common reference point for all symbols of the number of symbols 'M.' Each offset is calculated relative to the (same) first subcarrier (subcarrier '0') of the resource set 510. Then, for the first, second, third, and fourth symbols (symbols '0,' '1,' '2,' '3'), the offsets are respectively '0,' '1,' '2,' and '3.' That is, the offset sequence of the pattern 500A can be represented as {0, 1, 2, 3}. The number of symbols 'M' may be said to also characterize the length of the offset sequence. The offset sequence may include a different offset value for each symbol of the number of symbols 'M,' thereby avoiding any overlap in frequency domain between symbols. In FIG. 5A, the generated sequence has a length of four.

Figure 5B:
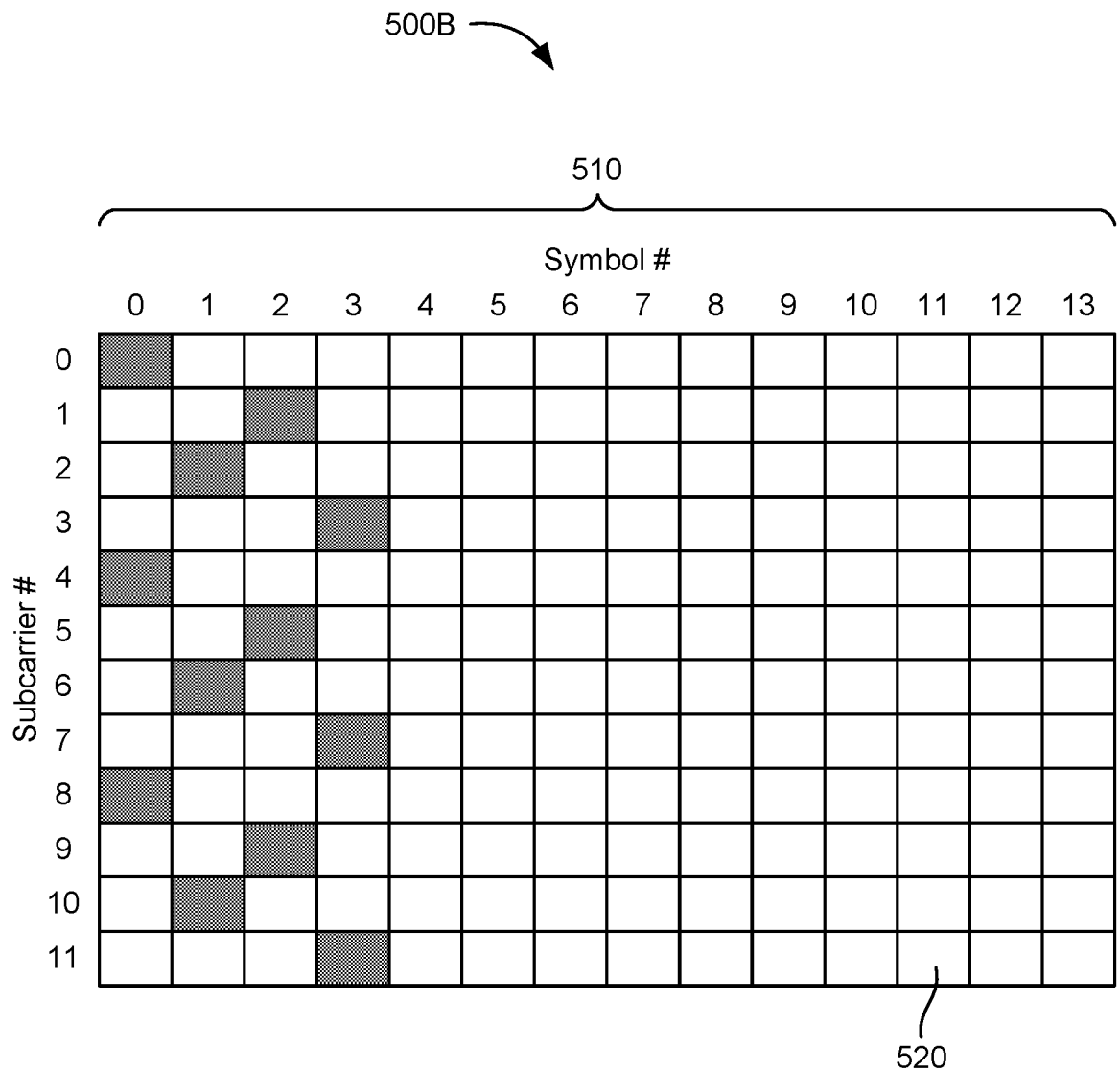
Figure 5C:
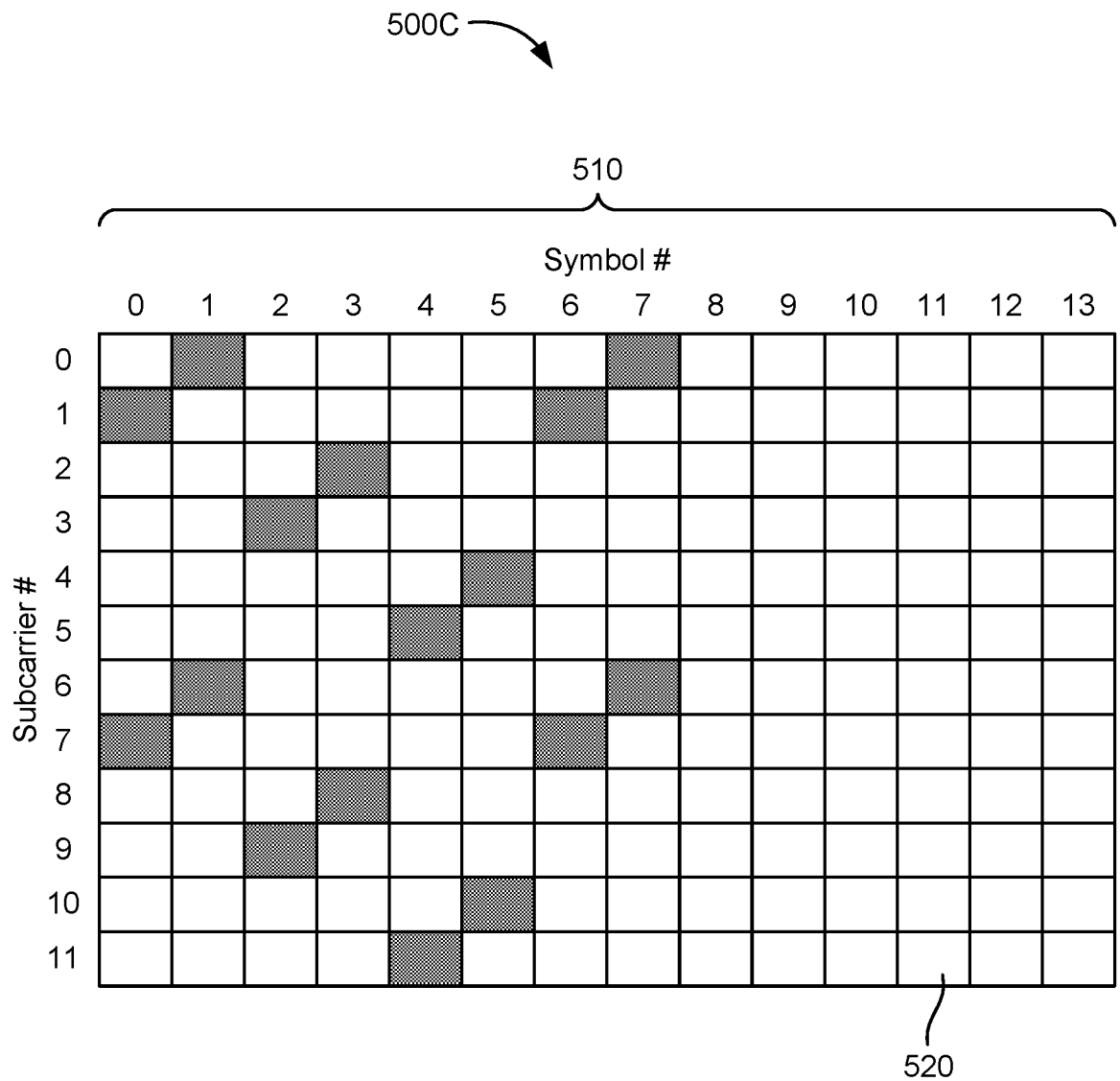

FIG. 5B illustrates a signal pattern 500B, which is another example of a signal pattern in which N=4 and M=4. However, the signal pattern 500B has an offset sequence of {0, 2, 1, 3}, which is different from the offset sequence of the signal pattern 500A. FIG. 5C illustrates a signal pattern 500C in which N=6 and M=8. The signal pattern 500C has an offset sequence of {1, 0, 3, 2, 5, 4, 1, 0}.

The mapping of a reference signal (e.g., PRS, SRS) to REs within a slot should be at least partially decodable even when the reference signal is punctured or otherwise partially compromised. In other words, the mapping of the reference signal to REs should be tolerant to partial disruptions and interferences. Note that "puncturing" is a technique where a lower priority signal within a given RE, symbol, slot, etc. is not transmitted in favor of a higher priority signal being transmitted within the same RE, symbol, slot, etc.

For reference signals for positioning in LTE, a comb size of comb-6 plus a staggered design is allowed so that a reuse of six can be achieved. In NR, there is more flexibility. In the downlink, the number of symbols 'M' for DL-PRS is configurable from the set of {2, 4, 6, 12}, and the comb size 'N' for DL-PRS is configurable from the set of {2, 4, 6, 12}. In the uplink, the number of consecutive symbols 'M' for UL-PRS is configurable from the set of {1, 2, 4, 8, 12}, and the comb size 'N' for UL-PRS is configurable from the set of {2, 4, 6, 12}.

In LTE, it is difficult to design an offset map that is tolerant to partial disruptions. In NR, more flexibility is afforded. However, since the comb size 'N' and the number of symbols 'M' are limited to just a few choices, reference signal mapping is still limited in NR.

Accordingly, the present disclosure provides techniques to generate offset sequences. In one technique, offset sequences may be systematically generated by prime factorization that covers any combination of comb size 'N' and symbols 'M' per positioning reference signal.

One reason for using prime factorization is that any integer 'N' can be represented as a product of prime numbers. For example, 4=2*2, 5=1*5, 6=2*3, 7=1*7, 8=2*2*2, 9=3*3, 10=2*5, 11=1*11, 12=2*2*3, etc. One or more sequence lists may be associated with each prime number. For example, a sequence list associated with the prime number '3' may be ({0, 1, 2}, . . . ). As another example, a sequence list associated with the prime number '5' may be ({0, 2, 4, 1, 3}, . . . ). Such one or more sequence lists associated with prime numbers may be stored as "primeseqlists." For a comb size 'N,' one or more offset sequences may be generated based on the sequence of the sequence list associated with the prime factors of 'N.'

Figure 6:
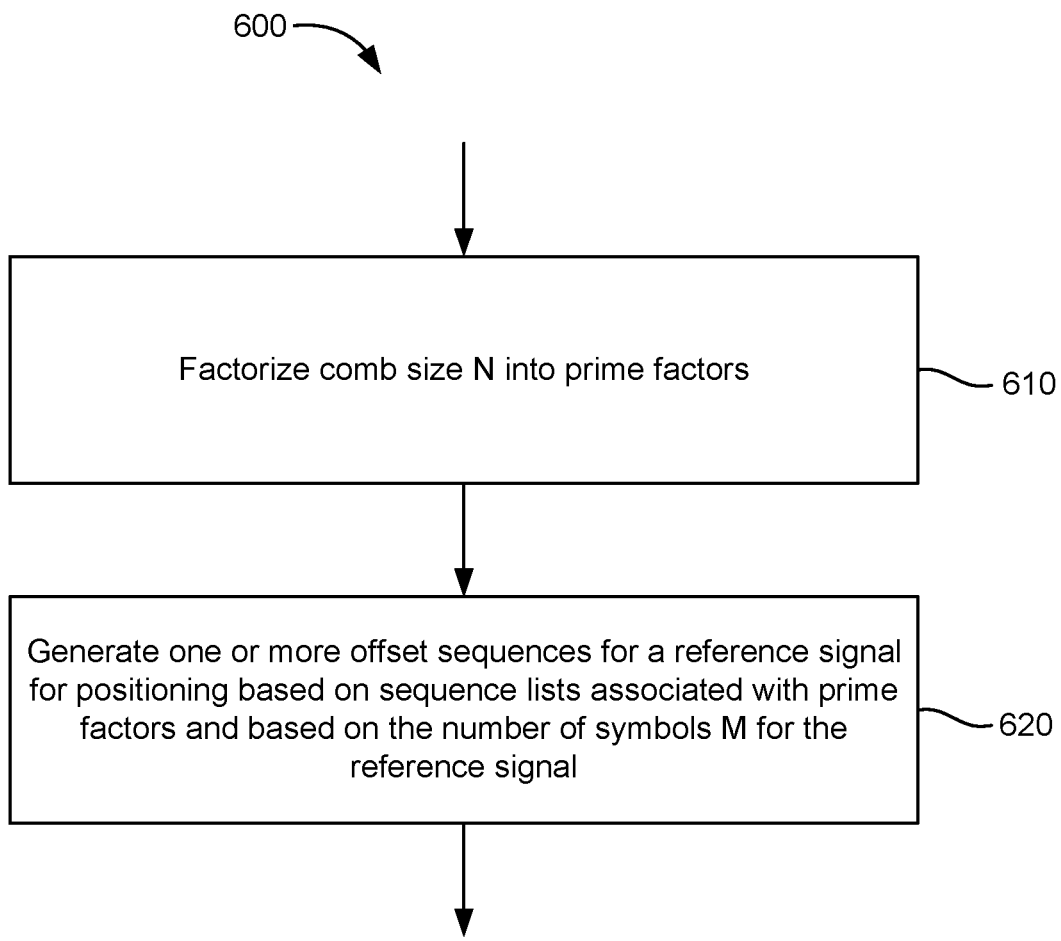
FIG. 6 illustrates a flow chart of an example method of generating offset sequences for comb patterns, according to aspects of the disclosure.

FIG. 6 illustrates a flow chart of an example method 600 of generating offset sequences for comb patterns, according to aspects of the disclosure. The method 600 may be performed by a sequence generating entity, such as a base station (e.g., any of the base stations described herein) or a core network component (e.g., location server 230, LMF 270, SLP 272). The method 600 may also be performed by a UE (e.g., any of the UEs described herein). Thus, the method 600 may be implemented to generate offset sequences of reference signals for positioning in both the uplink and in the downlink.

In an aspect, the method 600 may be performed during operation of the network entity and/or the UE. Alternatively, or in addition thereto, the method 600 may be performed offline, and the generated offset sequences may be incorporated in a lookup table and/or distributed as convenient. For example, a serving base station may configure a UE with pre-generated offset sequences.

At block 610, the sequence generating entity factorizes the comb size 'N' into its prime factors. For example, if N=6, then in block 610, the prime factors would be the numbers '2' and '3.'

At block 620, the sequence generating entity generates one or more offset sequences for a reference signal for positioning (e.g., PRS, SRS, etc.) based on sequence lists associated with the prime factors and based on the number of symbols 'M' for the reference signal, i.e., with the offset sequence length 'M.'

FIG. 7 illustrates an example of an algorithm 700 for implementing the method 600, that is, to systematically generate one or more offset sequences. For instance, the algorithm 700 may be used to systematically generate offset sequences that cover any combination of 'N' and 'M.' The algorithm 700 of FIG. 7 may be used to generate one or more offset sequences for a reference signal for positioning (e.g. PRS, SRS, etc.). However, it should be recognized that the algorithm 700 may be generalized to generate offset sequences for any signal, including reference signals for positioning, in the uplink and/or the downlink.

Inputs to algorithm 700 may include 'N,' representing the comb size, and 'M.' representing the number of symbols of the reference signal per sequence. Algorithm 700 may incorporate some prior knowledge, including "primelist" and "primeseqlist." The "primelist" may be a table of prime numbers. In algorithm 700, the first four prime numbers (i.e., 2, 3, 5, 7) may be in the "primelist." The "primeseqlist" may be a table of sequence lists, each associated with a specific prime number. In algorithm 700, the first four sequence lists (i.e., ({0, 1}, . . . ), ({0, 1, 2}, . . . ), ({0, 2, 4, 1, 3}, . . . ) and ({0, 3, 6, 1, 4, 2, 5}, . . . ) may be in the "primeseqlist." As will be appreciated, this can be extended to include larger prime numbers.

Based on the "primelist", a "fpf(•)" operation (e.g., a prime factorization function) may factorize a value (e.g. value 'N' representing the comb size) into lists of prime factors. For example, for a comb size of N=4, this integer 'N' can be factorized into the prime numbers {2, 2} because 4=2*2, in the following: "p_lists"={2, 2}; for a comb size of N=6, this integer 'N' can be factorized into the prime numbers {2, 3} because 6=2*3, in the following: "p_list"={2, 3}.

Based on "primeseqlist," a "primeseqlist(•)" operation may retrieve one or more associated sequence lists associated with the prime numbers. For each prime number (e.g., each prime number of "p_list"), the associated sequence list may include one or more offset sequences (also referred to as prime sequences). For example, for prime number '2,' a prime sequence may be {0, 1} or {1, 0}. That is, the sequence list associated with prime number '2' may include sequences {0, 1} and {1, 0}. Note that the sequence list associated with a prime number may itself be considered as an offset sequence since it is not possible to further factor a prime number list by itself.

As another example, for prime number '3' (e.g., obtained from factorizing N=6 into its prime factors 6=3*2), the associated sequence list may include one of sequences {0, 1, 2}, {1, 0, 2}, {0, 2, 1}, etc. It should be noted that it is not required for the sequence list associated with a prime number to include all possible sequences. For example, for prime number '3,' there can be as many as six different sequences. However, all six are not required to be included in the sequence list for prime number '3.'

Note that for each prime number, the sequences associated with the prime number are of the length equal to the prime number and include all non-negative integer values from zero up to the prime number −1. For example, as seen, the lengths of the sequences associated with prime numbers '2' and '3' are respectively two and three as well and include all non-negative integer values within interval [0, 2] and [0, 3], respectively. Please note [a, b]={x|a≤x<b}. Again, while the sequence lists associated with two prime numbers ('2' and '3') are shown, this can be extended as desired or as necessary.

Algorithm 700 may include at least some of the following portions—an initialization portion, a main body, and a post processing portion. In the initialization portion, the algorithm 700 may initialize based on the comb size 'N.' As seen, 'N' is factored into prime factors in variable "p_list." For example, if N=4, the prime factors would be '2' and '2.' That is, "p_list"={2, 2}. As another example, if N=6, then "p_list"={2, 3}.

Next, the algorithm 700 generates one or more unique permutations of the prime factors, that is, generates unique permutations of "p_list" (e.g., by reversing the order), and assigns the unique permutations to variable "P_lists." For example, for N=4 "p_list"={2, 2}, and reversing the order of "p_list" would still be {2, 2}. This means that for N=4, "P_lists"=({2, 2}), meaning it would include one sequence. However, for N=6, if "p_list"={2, 3}, then another unique list {3, 2} can be generated by reversing the order. Thus, for N=6, "P_lists"=({2, 3}, {3, 2}). The algorithm 700 then may initialize variable "PRS_offsets" to { }, that is, to an empty set. "PRS_offsets" is used to collect the offset sequences "PRSoffset" as each sequence is generated.

In the main body of algorithm 700, for each "p_list" of "P_lists," an offset sequence is generated for that "p_list," and the generated offset sequence is added to "PRS_offsets." The main body of algorithm 700 (i.e., the main for-loop) may be conceptually divided into the following three parts. In the first part, an offset sequence is generated of length 'N' for each "p_list." In the second part, the length 'N' sequence is extended or pruned as necessary to length 'M.' In the third part, the length 'M' offset sequence is added to the list of sequences, that is, added to "PRS_offsets."

The main body will be described in more detail with a specific example assuming N=6, meaning that "P_lists"= ({2, 3}, {3, 2}). In this case, "p_list"={2, 3} the first time through the main for-loop. In the first part, "PRSoffset" is initialized to {0}. The offset sequence of length 'N' generated for the "p_list"={2, 3} is assigned to "PRSoffset." In other words, "PRSoffset" may correspond to one generated sequence.

The first part may include an outer for-loop and an inner for-loop. The outer for-loop may be performed for each prime number in the "p_list." In this instance, the outer for-loop may be performed first for "pNum"=2, and second for "pNum"=3. Within the outer for-loop, a temporary variable "templist" is assigned to an empty sequence { }.

Next, the inner for-loop is performed. Within the inner for-loop, "primeseqlist"("pNum") may retrieve a prime sequence associated with the prime number "pNum." Then first time through the inner for-loop, "pNum"=2, meaning that "primeseqlist"("pNum") may retrieve the prime sequence {0, 1}, meaning that the variable "s_i"=0 the first time through, and "s_i"=1 the second time through.

Note that at first time through the inner for-loop, "s_i"=0, "pNum"=2, "PRSoffset"={0}, and "templist"=(i.e., empty). As such, the operation "pNum" * "PRSoffset" +"s_i"=0, and "templist"={empty, 0}={0}. In other words, the "templist" is no longer empty. Rather, it contains the offset value of '0.' The second time through the inner for-loop, "s_i"=1, "pNum"=2, "PRSoffset"={0}, and "templist"={0}. As such, the operation "pNum" * "PRSoffset" +"s_i"=1, and "templist"={0, 1}. Thereafter, "PRSoffset"="templist." This means that after the first time through the outer for-loop, "PRSoffset"={0, 1}.

The second time through the outer for-loop, "pNum"=3, and operation "primeseqlist"("pNum") retrieves the prime sequence associated with the prime number '3,' which in the algorithm 700 is {0, 1, 2}. This means that the inner for-loop will be performed three times—the first time with "s_i"=0, the second time with "s_i" =1, and the third time with "s_i"=2. For all three inner-loops, the "PRSoffset"={0, 1}.

The first time through the inner-loop with "s_i"=0, operation "pNum" * "PRSoffset" +"s_i" will yield two values— the first value based on '0' and the second value based on 1. ' Particularly, "templist"={'empty,' first value,' 'second value'}={3*0+0, 3*1+0}={0, 3}. The second time through the inner-loop with "s_i"=1, "templist"={"templist," 'first value,' 'second value'}={0, 3, 3*0+1, 3*1+1}={0, 3, 1, 4}. The third time through the inner-loop with "s_i"=2, "templist"={"templist," 'first value,' 'second value'}={0, 3, 1, 4, 3*0+2, 3*1+2}={0, 3, 1, 4, 2, 5}, which is assigned to "PRSoffset," representing the offset sequence generated for comb size 'N.' Note that the length of the generated sequence is 'N.'

In the second part of the main body, the generated sequence PRSoffset may be extended if 'N' is less than 'M,' that is, when the number of symbols 'M' for the pattern is greater than the length of the generated sequence. In this instance, the extension may be a consecutive subset of [K, K+M−N−1] indexes into the "PRSoffset" sequence, where 'K' is the starting point of the offset. For example, if M=8 and K=0 for the sequence {0, 3, 1, 4, 2, 5}, the extension would be the values at indexes [0, 1], which are {0, 3}, meaning that the extended sequence would be {0, 3, 1, 4, 2, 5, 0, 3}. It should be noted that 'K' need not be zero.

On the other hand, the generated sequence "PRSoffset" may be truncated if 'N' is greater than 'M,' that is, when the number of symbols 'M' for the pattern is less than the length of the generated sequence. In this instance, the truncation may be a consecutive subset of [K−1, K+M−2] indexes into the "PRSoffset" sequence, where 'K' is the starting point of the offset. Again, 'K' need not be zero, that is, the truncation is not limited to the first 'M' values of the "PRSoffset." For example, if M=4 and K=2 for the sequence {0, 3, 1, 4, 2, 5}, the truncation would be the values at indexes [1, 4], meaning that the truncated sequence would be {3, 1, 4, 5}.

In the third part of the main body, the generated offset sequence "PRSoffset" (possibly extended or truncated) may be added to "PRS_offsets." After performing the main body for multiple "p_lists," there may be multiple offset sequences in "PRS_offsets."

In the post processing portion of algorithm 700, "PRS_offsets" may be pruned to a unique list of offset sequences through the operation "PRS_offsets"=Unique ("PRS_offsets"). The offset sequences generated at this juncture may be used. Alternatively, or in addition thereto, if desired, more offset sequences may be generated through the Shift("PRS_offsets," comb_offset") operation described in further detail below.

Figure 8:
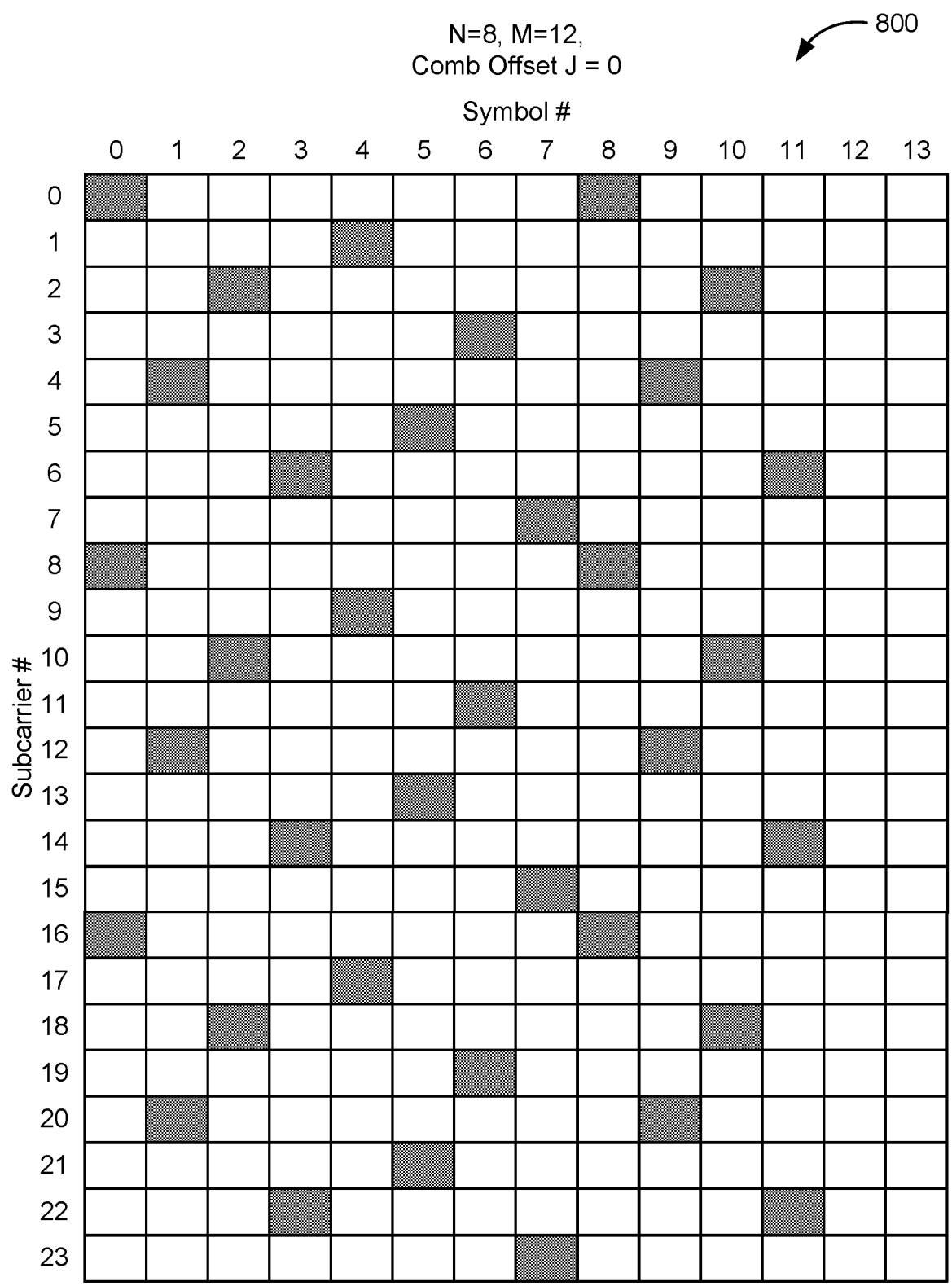
FIGS. 8, 9A, 9B, and 10 illustrate examples of comb patterns generated through the example algorithm of FIG. 7, according to aspects of the disclosure.

FIG. 8 illustrates an example signal pattern 800 having an offset sequence generated for N=8 and M=12 (optionally K=0) using algorithm 700 just before performing the Shift ("PRS_offsets," "comb_offset") operation, that is, after performing the Unique("PRS_offsets") operation. The generated offset sequence is {0, 4, 2, 6, 1, 5, 3, 7, 0, 4, 2, 6}. In this instance, since 'N' is less than 'M' the sequence is expanded by repeating the first four offsets. This is but one option to expand the sequence. In another option, a part of an offset sequence generated by a different prime list may be appended.

Figure 9A:
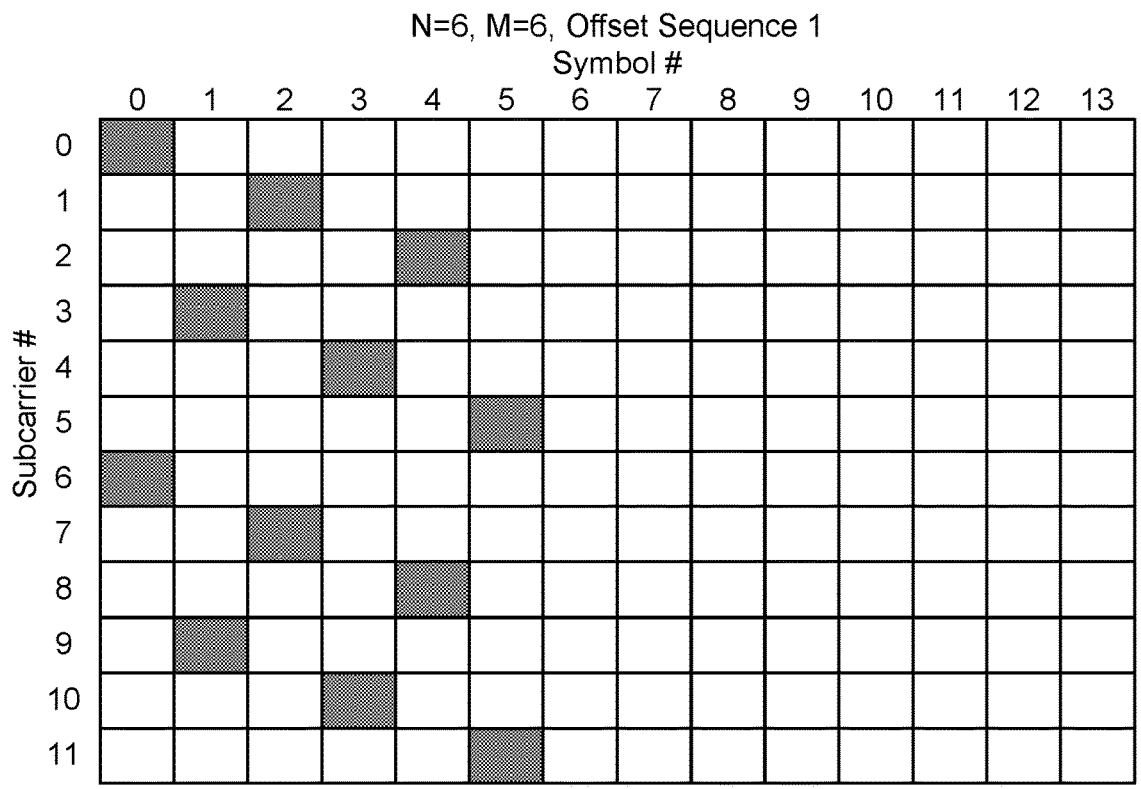
Figure 9B:
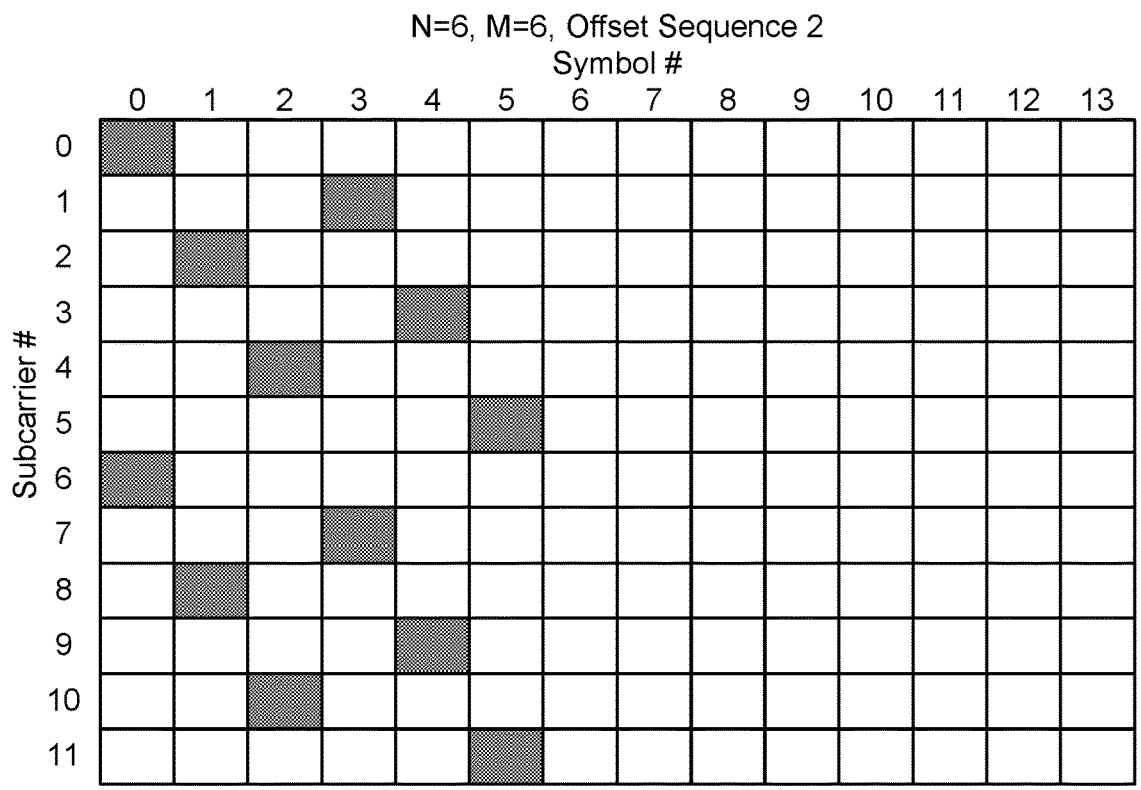

Note that in some instances, there can be more than one unique sequence generated. FIGS. 9A and 9B illustrate two sequences generated with N=6 and M=6 (optionally K=0). The first sequence of FIG. 9A is {0, 3, 1, 4, 2, 5} and the second sequence of FIG. 9B is {0, 2, 4, 1, 3, 5}. In such instances, a network node (e.g., the serving base station) may randomly choose one of the sequences and inform the UE(s) about the offset sequence selected. Alternatively, one of the sequences may be chosen by default without randomness.

Note that in both FIGS. 8 and 9A and 9B, the offset sequences are such that the resource elements used to transmit the reference signal are more uniformly distributed, rather than appearing like a staircase pattern. That is, between consecutive symbols, the resource elements for the reference signal are not in adjacent subcarriers. This makes the generated offset sequence more tolerant to punctures and collisions. The uniform distribution may be achieved, for example, by generating the offset sequences based on the prime factors of N.

Table 2 below lists examples (not necessarily exhaustive) of offset sequences generated for downlink (e.g., PRS) and for uplink (e.g., SRS) reference signals for positioning using algorithm 700. In all these examples, it is assumed that comb offset=0 for appending and truncating.

TABLE 2

| Downlink | Uplink |
|---|---|
| N = 2, M = 2 | N = 2, M = 1 |
| {0, 1} | {0} |
| N = 2, M = 4 | N = 2, M = 1 |
| {0, 1, 0, 1} | {0} |
| N = 2, M = 6 | N = 2, M = 4 |
| {0, 1, 0, 1, 0, 1} | {0, 1, 0, 1} |
| N = 4, M = 2 | N = 2, M = 8 |
| {0, 2} | {0, 1, 0, 1, 0, 1, 0, 1} |
| N = 4, M = 4 | N = 2, M = 8 |
| {0, 2, 1, 3} | {0, 1, 0, 1, 0, 1, 0, 1, 0, 1} |
| N = 4, M = 6 | N = 4, M = 1 |
| {0, 2, 1, 3, 0, 2} | {0} |
| N = 6, M = 2 | N = 4, M = 2 |

TABLE 2-continued

| Downlink | Uplink |
|---|---|
| \|2, 3\| {0, 2} | {0, 2} |
| \|3, 2\| {0, 3} | |
| N = 6, M = 4 | N = 4, M = 4 |
| \|2, 3\| {0, 2, 4, 1} | {0, 2, 1, 3} |
| \|3, 2\| {0, 3, 1, 4} | |
| N = 6, M = 6 | N = 4, M = 8 |
| \|2, 3\| {0, 2, 4, 1, 3, 5} | {0, 2, 1, 3, 0, 2, 1, 3} |
| \|3, 2\| {0, 3, 1, 4, 2, 5} | |
| N = 12, M = 12 | N = 4, M = 12 |
| {0, 6, 3, 9, 1, 7, 4, 10, 2, 8, 5, 11} | {0, 2, 1, 3, 0, 2, 1, 3, 0, 2, 1, 3} |
| | N = 8, M = 1 |
| | {0} |
| | N = 8, M = 2 |
| | {0, 4} |
| | N = 8, M = 4 |
| | {0, 4, 2, 6} |
| | N = 8, M = 8 |
| | {0, 4, 2, 6, 1, 5, 3, 7} |
| | N = 8, M = 12 |
| | {0, 4, 2, 6, 1, 5, 3, 7, 0, 4, 2, 6} |

In the downlink column of Table 2, note that for the three entries in which N=6, each has two possible offset sequences. This is because there were two unique "p_list" values in "P_lists." Namely, "P_lists"=({2, 3}, {3, 2}). Each offset sequence corresponds to one value of the "p_list." Also note that algorithm 700 does not depend on whether the generated offset sequence is for uplink or downlink. That is, for the same values of N and M, the generated offset sequence is the same regardless of whether the sequence is for uplink or for downlink. For example, for N=4 and M=4, the generated sequence is {0, 2, 1, 3} for both uplink and downlink.

An exemplary offset sequence listed in the downlink column of Table 2 is the offset sequence {0, 6, 3, 9, 1, 7, 4, 10, 2, 8, 5, 11}, which is generated for N=12 and M=12. This offset sequence allows generating offset sequences for a reference signal for positioning an improved positioning due to the high comb size 'N' and the higher number of symbols 'M' to be used for reference signals. Note that even with this long offset sequence, there is no overlap in a frequency domain between (different) symbols.

Referring back to FIG. 7, and as indicated above, the offset sequences accumulated in "PRS_offsets" after the Unique("PRS_offsets") operations may be used. However, in an aspect, one or more other offset sequences may be generated based on these "first" offset sequences through the Shift("PRS_offsets," "comb_offset") operation. These "second" offset sequences may be used instead of or in addition to the originally generated offset sequences.

In the Shift operation, a first offset sequence may be shifted in tones by an amount 'J' (representing a comb offset) with wraparound to generate a second offset sequence. The comb offset 'J' may be viewed as setting an initial shift in tones. Referring back to FIG. 8, the illustrated offset sequence may be viewed as an example of a first sequence with no comb offset, i.e., J=0.

Figure 10:
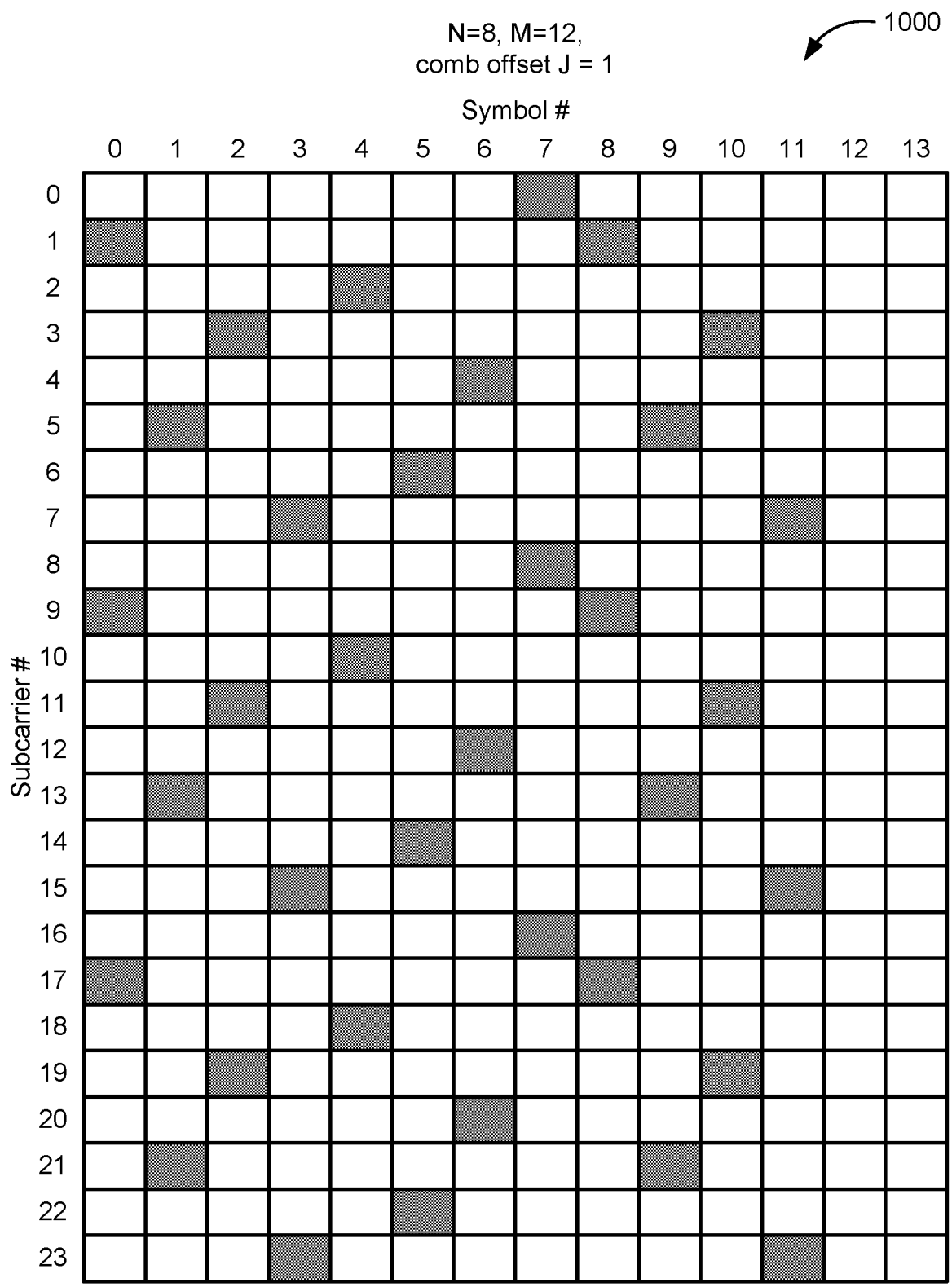

FIG. 10 illustrates an example signal pattern 1000 having the offset sequence illustrated in FIG. 8 but shifted by one tone. That is, in FIG. 8, J=0, and in FIG. 10, J=1. Thus, FIG. 8 illustrates an offset sequence of {0, 4, 2, 6, 1, 5, 3, 7, 0, 4, 2, 6}, while FIG. 10 illustrates an offset sequence of {1, 5, 3, 7, 2, 6, 4, 0, 1, 5, 3, 7}. An advantage of the optional Shift operation is that multiple puncture tolerant second offset sequences may be generated from one puncture tolerant first offset sequence. The shift allows a frequency reuse factor 'N' with comb size 'N.'

The Shift operation may be formalized as follows. Assume a first sequence 'D' of length 'M,' meaning $D=\{D_0, D_1, \ldots, D_{(M-1)}\}$. A second offset sequence 'X' of the same length 'M,' meaning $X=\{X_0, X_1, \ldots, X_{(M-1)}\}$, may be generated by shifting the subcarriers of the first sequence 'D' by an amount 'J' by setting $X_m=\mathrm{mod}(D_m+J, N)$, where 'N' is the comb size, which coincides with the length of the offset sequence.

Alternatively, or in addition thereto, shifting may also take place in the time domain (not shown). That is, symbols may be shifted to generate one or more second sequences. When shifting symbols, the mod operation should be based on 'M.' For example, if 'L' represents the symbol shift amount, then $X_m=D_{(mod(m+L, M))}$. For example, if M=8 and L=3, then a second sequence $X=\{D_3, D_4, D_5, D_6, D_7, D_0, D_1, D_2\}$ may be generated.

FIG. 11 illustrates an example of another algorithm 1100 for systematically generating offset sequences that also covers any combination of 'N' and 'M.' While FIG. 11 illustrates generating offset sequences for PRS, it should be recognized that the algorithm may be generalized to generate offset sequences for any signal, including reference signals for positioning, in the uplink and/or the downlink.

Inputs to algorithm 1100 may include 'N' and 'M.' Inputs 'S' and/or 'K' may additionally be provided to algorithm 1100. Input 'S' may represent a step size and input 'K' may represent an initial sequence value. Algorithm 1100 may generate an offset sequence 'O' of length 'M.' That is, $O=\{O_0, O_1, \ldots O_m \ldots O_{M-1}\}$. The values of 'S' and 'N' can be chosen to provide an even distribution within subcarriers, much like algorithm 700.

As shown, algorithm 1100 may also include an initialization portion, a main body portion, and a post processing portion. In the initialization portion, the first sequence value '$O_0$' may be initialized to 'K.' If not provided, 'K' may default to '0' or to some random integer.

In the main body portion, the remaining sequence values '$O_1$' to '$O_{M-1}$' may be iteratively generated. In the main loop, each sequence value '$O_m$' may be generated based on the previous sequence value '$O_{m-1}$,' the step size 'S,' and the comb size 'N.' For example, operation $O_m=\mathrm{mod}(S+O_{m-1}, N)$ may be performed. The sequence values may be stored in "PRSoffset" to represent the generated offset sequence.

An example operation of algorithm 1100 will be described for N=5, M=6, S=3, and K=0. In this scenario, the generated offset sequence 'O' will have a length of six, that, $O=\{O_0, O_1, O_2, O_3, O_4, O_5\}$.

In the initialization portion, the first sequence value is set to zero, that is, $O_0=K=0$. In the main body portion, the remaining sequence values of $O_1, O_2, O_3, O_4, O_5$ are set. For example, the remaining sequence values may be set as follows:

$O_1=\mathrm{mod}(S+O_0,N)=\mathrm{mod}(3+0,5)=3;$ $O_2=\mathrm{mod}(S+O_1,N)=\mathrm{mod}(3+3,5)=1;$ $O_3=\mathrm{mod}(S+O_2,N)=\mathrm{mod}(3+1,5)=4;$ $O_4=\mathrm{mod}(S+O_3,N)=\mathrm{mod}(3+4,5)=2;$ and $O_5=\mathrm{mod}(S+O_4,N)=\mathrm{mod}(3+2,5)=0.$ Thus, the offset sequence "PRSoffset"=$\{0, 3, 1, 4, 2, 0\}$ is generated.

Note that the choice of step size 'S' can have a significant influence in the distribution of the resource elements for the reference signal. For example, when S=0 (i.e., there is no step size), the pattern will be horizontal. That is, the same subcarrier 'K' will be used across 'M' symbols for the reference signal. Thus, in an aspect, 'S' should be greater than zero. For example, when S=1, the pattern will appear like a staircase. In an aspect, the step size 'S' may be set to S=N/2 (e.g., when 'N' is even), or S=Floor(N/2) or S=Ceiling(N/2) (e.g., when 'N' is odd).

The post processing portion includes setting "PRSoffset" to mod(Shift("PRSoffset," 'J'), 'N'). By this operation, if an RE in the generated sequence would be outside the PRB in which the reference signal is to be transmitted, the RE is "wrapped around" to the corresponding subcarrier in the PRB. For example, if an RE in the generated sequence would fall on the second subcarrier beyond the last subcarrier of the PRB, the RE can be moved to the second subcarrier of the PRB (subcarrier '1').

Figure 12:
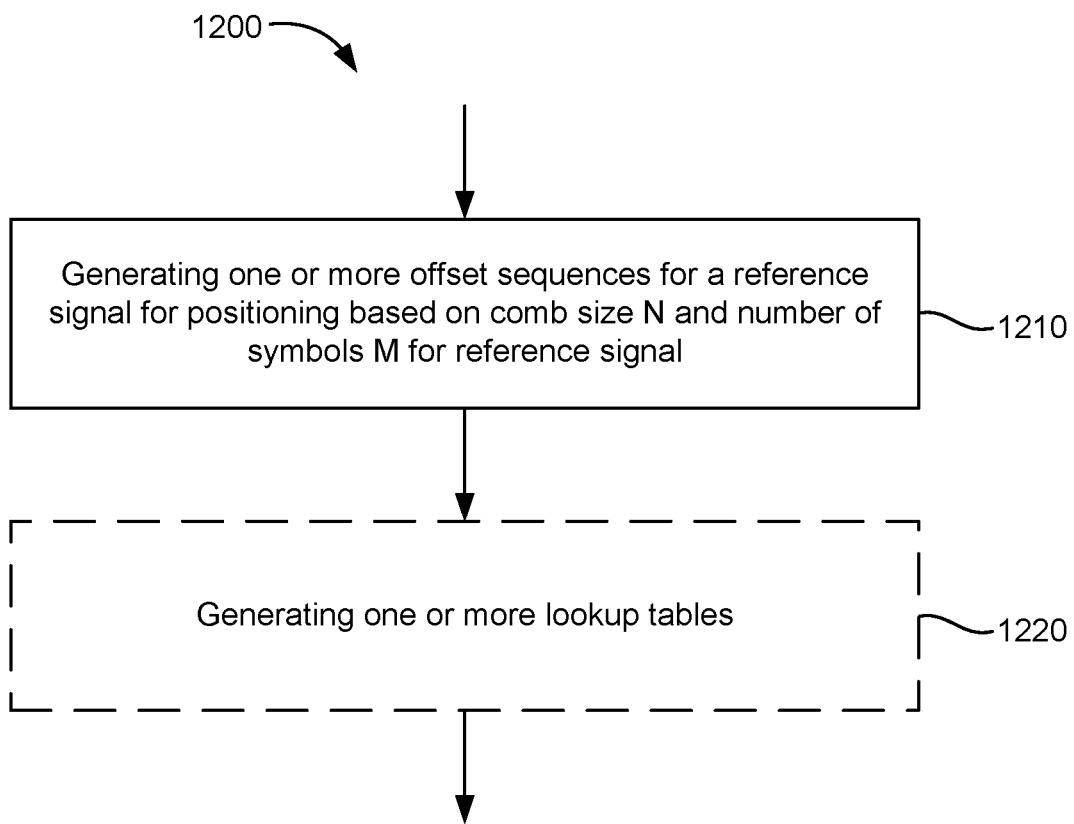
FIGS. 12-15 illustrate flow charts of example methods and processes, according to aspects of the disclosure.

FIG. 12 illustrates a flow chart of a method 1200, which is an example implementation of methods and algorithms for generating offset sequences as described above. The method 1200 may be performed by a base station (e.g., any of the base stations described herein), a core network component (e.g., location server 230, LMF 270, SLP 272, etc.), or a UE. For ease of reference, an entity capable of generating offset sequences (base station, core network component, UE, etc.) will be generically referred to as sequence generating entity.

In block 1210, the sequence generating entity generates one or more offset sequences for a reference signal for positioning (e.g., PRS, SRS, etc.) based on a comb size 'N' and a number of symbols 'M' for the reference signal. As described above, 'M' may represent the number of symbols (e.g., OFDM symbols) allocated for the transmission of the reference signal per slot.

The method 1200 may be performed during operation of the sequence generating entity. Alternatively, or in addition thereto, the method 1200 may be performed offline, and the generated offset sequences may be incorporated in a lookup table and/or distributed as convenient. For example, a serving base station may configure a UE with pre-generated offset sequences.

In an aspect, the method 600 of FIG. 6 and the algorithm 700 of FIG. 7 may be viewed as an example implementation of block 1210. As described above with reference to block 610, the sequence generating entity factors the comb size number 'N' into its prime factors, and in block 620, the sequence generating entity generates one or more offset sequences for the reference signal for positioning.

Figure 13:
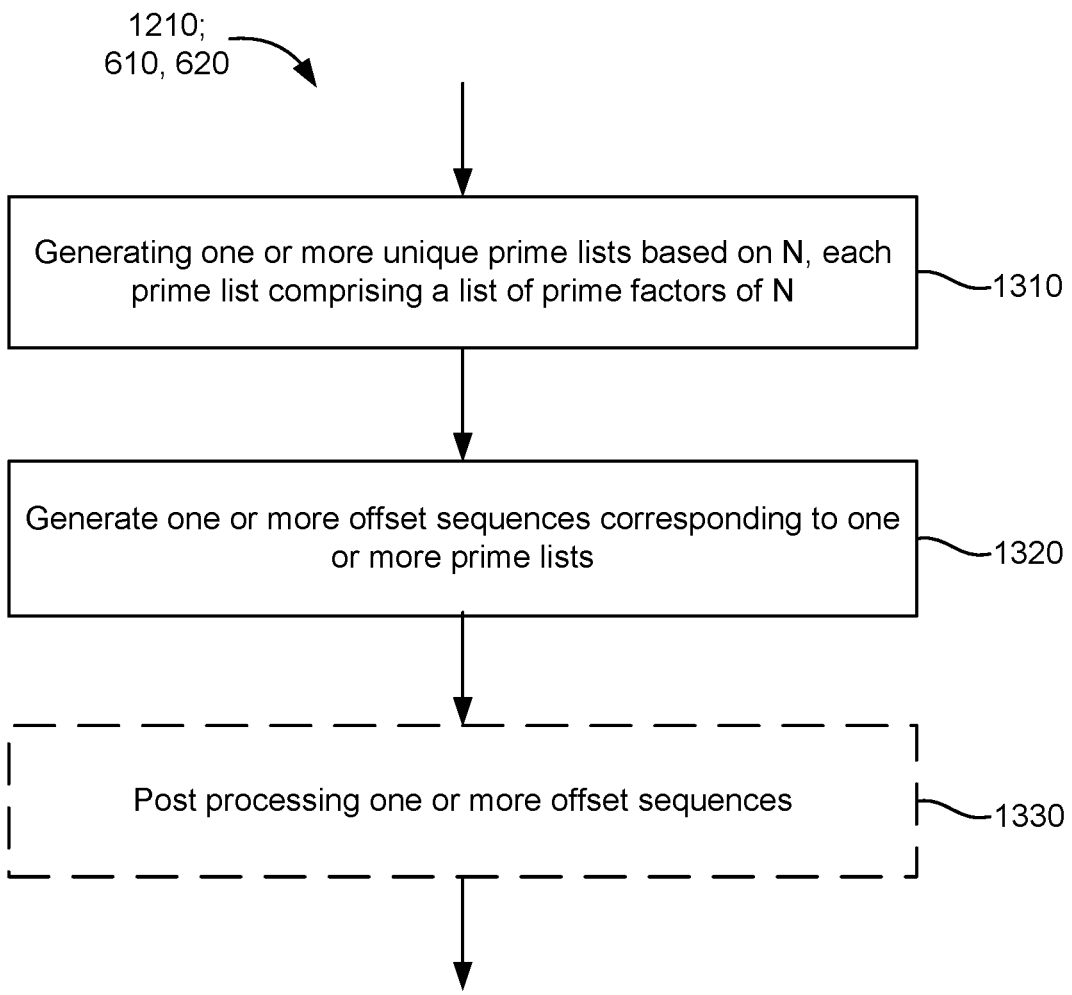

FIG. 13 illustrates a flow chart of an example process for the sequence generating entity to perform blocks 610 and 620 of FIG. 6.

In block 1310, the sequence generating entity generates one or more unique prime lists, each of the one or more unique prime list comprising a list of prime factors of the comb size 'N'. Block 1310 may correspond to the initialization portion of algorithm 700. For example, when N=6, the sequence generating entity in block 1310 may generate P_lists=({2, 3}, {3, 2}). This list includes a set of unique prime lists. As can be seen, the first prime list {2, 3} differs from the second prime list {3, 2}, and both prime lists include the prime factors '2' and '3' of N.

In block 1320, the sequence generating entity generates one or more offset sequences for a reference signal for positioning (e.g., PRS, SRS, etc.) based on sequence lists associated with the prime factors of each of the one or more prime lists generated in block 1310 and based on the number of symbols 'M' for the reference signal, i.e., a sequence length 'M.' Block 1320 may correspond to the main body portion of algorithm 700.

In optional block 1330, the sequence generating entity post-processes the one or more offset sequences generated in block 1320. Block 1330 may correspond to the post-processing portion of algorithm 700. Post processing may include generating one or more additional offset sequences from the one or more offset sequences, for example, by shirting the one or more offset sequences by comb offset 'J' or symbol shift amount 'L.'

Figure 14:
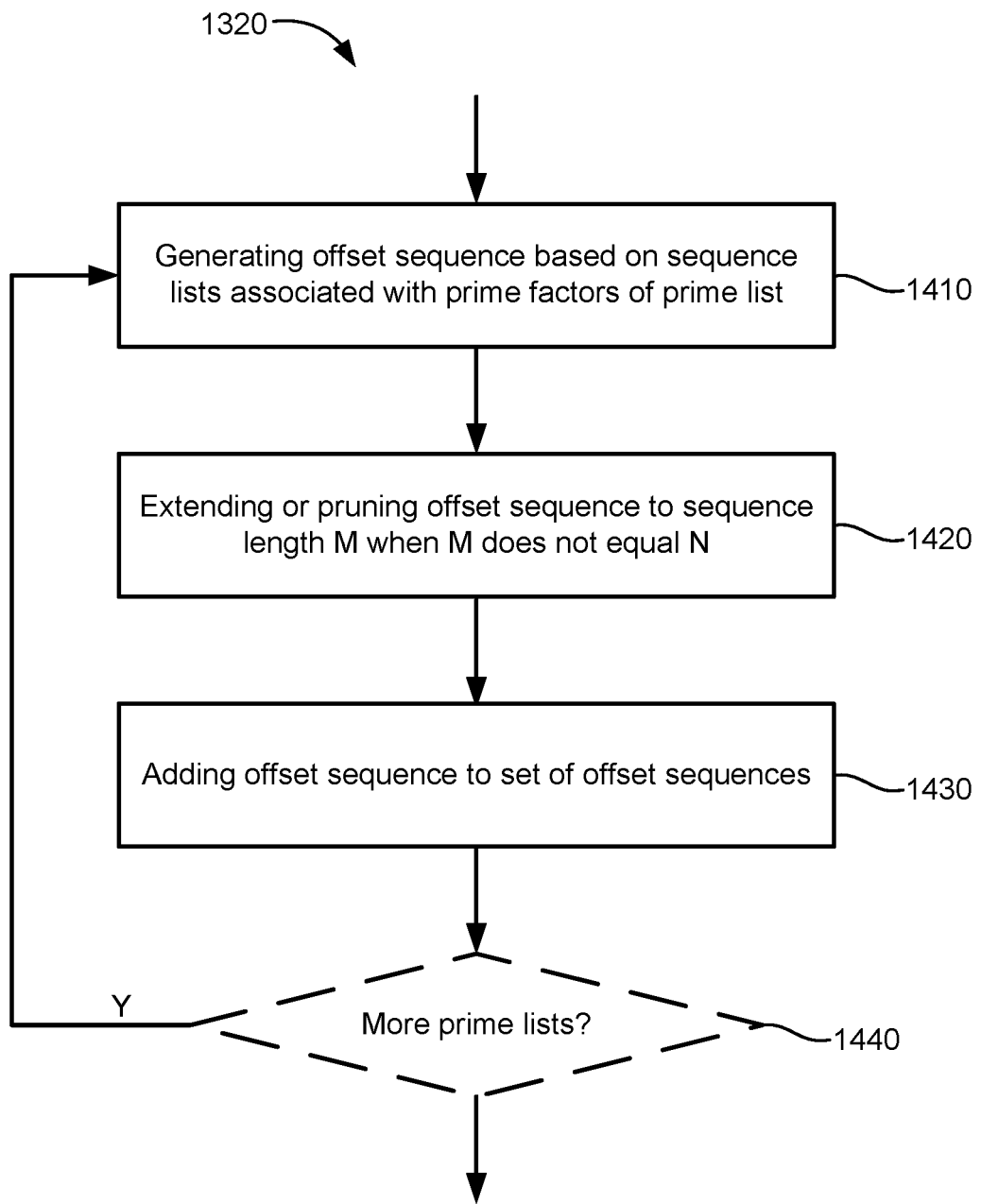

FIG. 14 illustrates a flow chart of an example process of the sequence generating entity to perform block 1320 of FIG. 13.

In block 1410, the sequence generating entity may generate an offset sequence (e.g., "PRSoffset") based on sequence lists (e.g. "primeseqlist") associated with prime factors of one of the prime lists (e.g., "p_list"). Block 1410 may correspond to the first part of the main body portion of algorithm 700.

In block 1420, the sequence generating entity extends or prunes the offset sequence to length 'M' as necessary when 'M' does not equal 'N.' Block 1420 may correspond to the second part of the main body portion of algorithm 700.

In block 1430, the sequence generating entity adds the offset sequence to a set of offset sequences (e.g., add "PRSoffset" to "PRS_Offsets"). Block 1430 may correspond to the third part of the main body portion of algorithm 700.

In optional block 1440, the sequence generating entity determines whether there are more unique prime lists (e.g., more prime lists "p_list" in variable "P_list"). If so ('Y' branch from block 1440), blocks 1410-1430 may be repeated. If not, the process ends.

Referring back to FIG. 13, in block 1330, the sequence generating entity post processes the one or more offset sequences. Block 1330 may correspond to the post processing portion of algorithm 700. Post processing may include pruning the one or more offset sequences to a set of offset sequences. This may correspond to the operation "PRS_offsets"=Unique("PRS_offsets"). Alternatively, or in addition thereto, post processing may include generating one or more additional offsets from the one or more offsets. This may correspond to the operation Shift("PRS_offsets," "comb_offset," 'J') as described in detail above.

Figure 15:
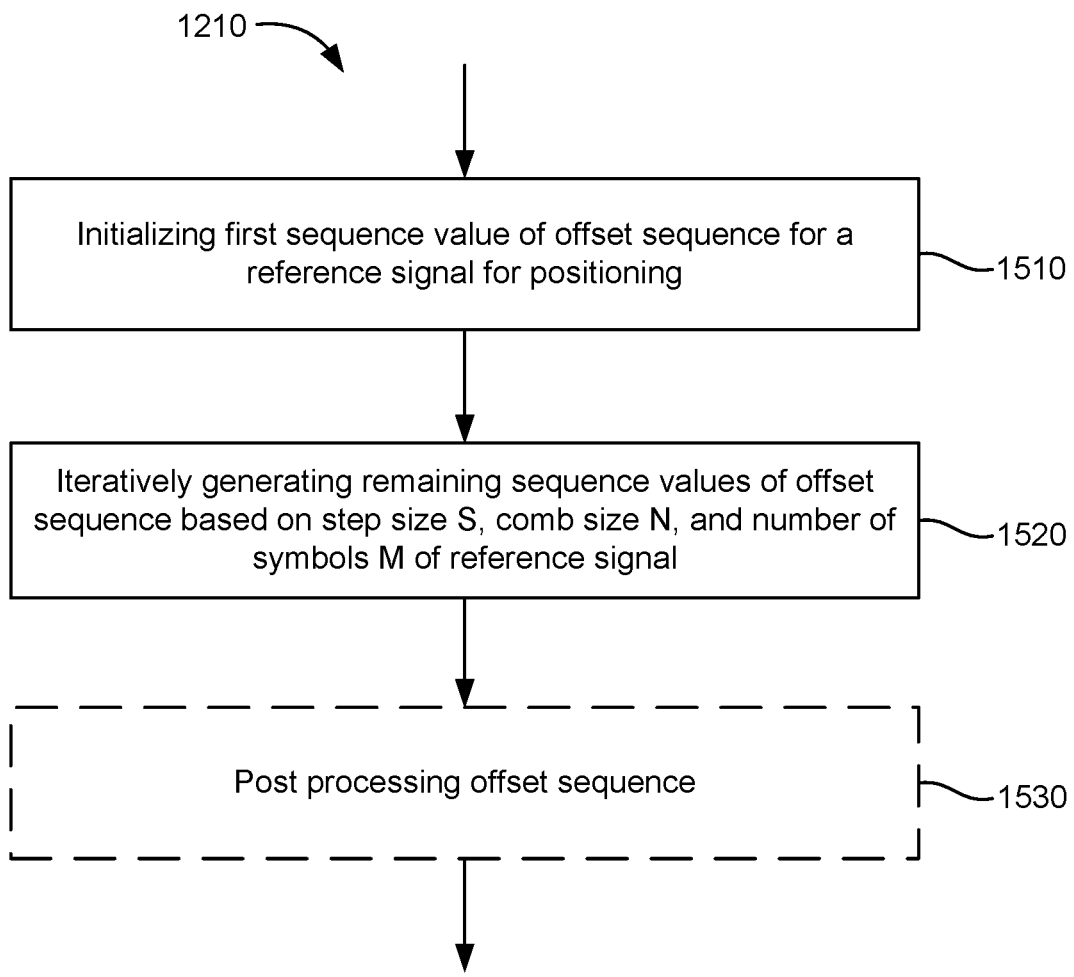

FIG. 15 illustrates a flow chart of an example process for the sequence generating entity to perform block 1210 of FIG. 12. FIG. 15 may correspond to algorithm 1100 of FIG. 11.

In block 1510, the sequence generating entity initializes a first sequence value '$O_0$' of an offset sequence to 'K.' If 'K' is not provided, a default value (e.g., K=0) may be assigned. Alternatively, a random integer may be assigned. Block 1510 may correspond to the initialization portion of algorithm 1100.

In block 1520, the sequence generating entity generates remaining sequence values '$O_1$' to '$O_{M-1}$' based on 'N' and 'S' and previous sequence value '$O_{m-1}$.' For example, operation $O_m = \mod(S + O_{m-1}, N)$ may be performed. Block 1520 may correspond to the main body portion of algorithm 1100.

In optional block 1530, the sequence generating entity post processes the one or more offset sequences generated in block 1520. Block 1530 may correspond to the post processing portion of algorithm 1100. Post processing may include generating one or more additional offset sequences from the one or more offset sequences, for example, by shifting the one or more offset sequences by comb offset 'J.'

Referring back to FIG. 12, in block 1220, the sequence generating entity may optionally generate one or more lookup tables to store the offset sequences generated in block 1210. For example, the network entity may perform block 1210 offline and generate the lookup tables in block 1220 for entities that are not capable of generating offset sequences.

Figure 16:
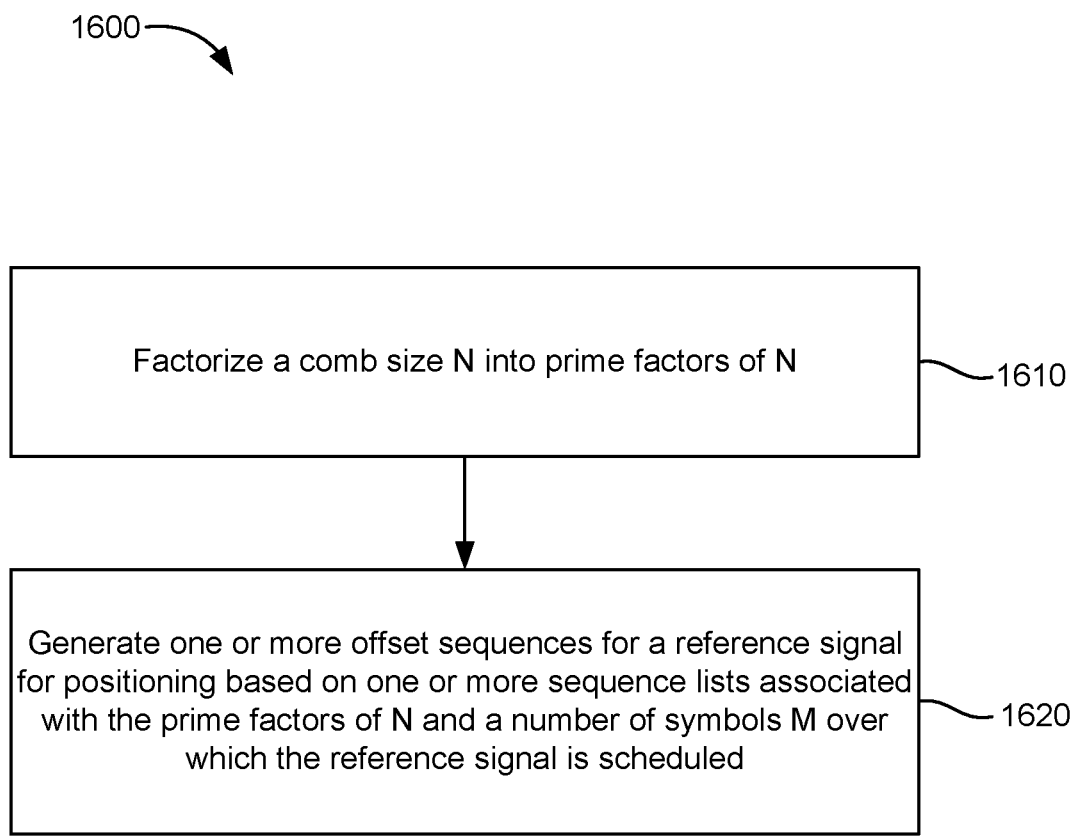
FIGS. 16 and 17 illustrate exemplary method of wireless communication, according to aspects of the disclosure.

FIG. 16 Illustrates an exemplary method 1600 of wireless communication, according to aspects of the disclosure. In an aspect, the method 1600 may be performed by a sequence generating entity, such as a base station (e.g., any of the base stations described herein), a UE (e.g., any of the UEs described herein), a network entity (e.g., location server 230, LMF 270, SLP 272, etc.).

At 1610, the sequence generating entity factorizes a comb size N into prime factors of N. In an aspect, where the sequence generating entity is a UE, operation 1610 may be performed by processing system 332, memory component 340, and/or sequence generator 342, any or all of which may be considered means for performing this operation. Where the sequence generating entity is a base station, operation 1610 may be performed by processing system 384, memory component 386, and/or sequence generator 388, any or all of which may be considered means for performing this operation. Where the sequence generating entity is a network entity, operation 1610 may be performed by processing system 394, memory component 396, and/or sequence generator 398, any or all of which may be considered means for performing this operation.

At 1620, the sequence generating entity generates one or more offset sequences for a reference signal for positioning based on one or more sequence lists associated with the prime factors of N and a number of symbols M over which the reference signal is scheduled. In an aspect, where the sequence generating entity is a UE, operation 1620 may be performed by processing system 332, memory component 340, and/or sequence generator 342, any or all of which may be considered means for performing this operation. Where the sequence generating entity is a base station, operation 1620 may be performed by processing system 384, memory component 386, and/or sequence generator 388, any or all of which may be considered means for performing this operation. Where the sequence generating entity is a network entity, operation 1620 may be performed by processing system 394, memory component 396, and/or sequence generator 398, any or all of which may be considered means for performing this operation.

Figure 17:
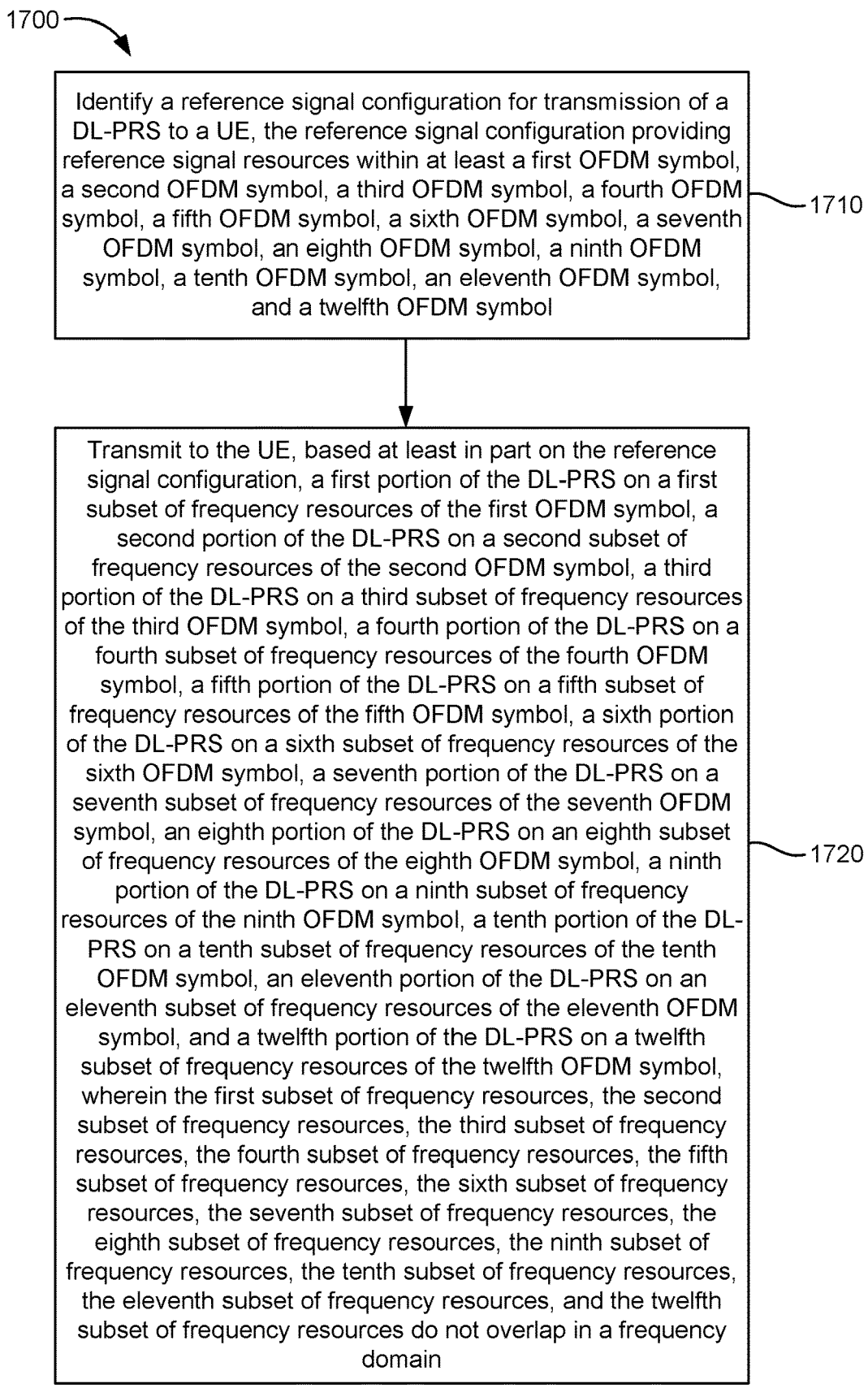

FIG. 17 illustrates an exemplary method 1700 for wireless communication, according to aspects of the disclosure. In an aspect, the method 1700 may be performed by a base station (e.g., any of the base stations described herein).

At 1710, the base station identifies a reference signal configuration for transmission of a DL-PRS to a UE (e.g., any of the UEs described herein), the reference signal configuration providing reference signal resources within at least a first OFDM symbol, a second OFDM symbol, a third OFDM symbol, a fourth OFDM symbol, a fifth OFDM symbol, a sixth OFDM symbol, a seventh OFDM symbol, an eighth OFDM symbol, a ninth OFDM symbol, a tenth OFDM symbol, an eleventh OFDM symbol, and a twelfth OFDM symbol. In an aspect, operation 1710 may be performed by processing system 384, memory component 386, and/or sequence generator 388, any or all of which may be considered means for performing this operation.

At 1720, the base station transmits, to the UE, based at least in part on the reference signal configuration, a first portion of the DL-PRS on a first subset of frequency resources of the first OFDM symbol, a second portion of the DL-PRS on a second subset of frequency resources of the second OFDM symbol, a third portion of the DL-PRS on a third subset of frequency resources of the third OFDM symbol, a fourth portion of the DL-PRS on a fourth subset of frequency resources of the fourth OFDM symbol, a fifth portion of the DL-PRS on a fifth subset of frequency resources of the fifth OFDM symbol, a sixth portion of the DL-PRS on a sixth subset of frequency resources of the sixth OFDM symbol, a seventh portion of the DL-PRS on a seventh subset of frequency resources of the seventh OFDM symbol, an eighth portion of the DL-PRS on an eighth subset of frequency resources of the eighth OFDM symbol, a ninth portion of the DL-PRS on a ninth subset of frequency resources of the ninth OFDM symbol, a tenth portion of the DL-PRS on a tenth subset of frequency resources of the tenth OFDM symbol, an eleventh portion of the DL-PRS on an eleventh subset of frequency resources of the eleventh OFDM symbol, and a twelfth portion of the DL-PRS on a twelfth subset of frequency resources of the twelfth OFDM symbol. The first subset of frequency resources, the second subset of frequency resources, the third subset of frequency resources, the fourth subset of frequency resources, the fifth subset of frequency resources, the sixth subset of frequency resources, the seventh subset of frequency resources, the eighth subset of frequency resources, the ninth subset of frequency resources, the tenth subset of frequency resources, the eleventh subset of frequency resources, and the twelfth subset of frequency resources do not overlap in a frequency domain. In an aspect, operation 1720 may be performed by processing system 384, memory component 386, and/or sequence generator 388, any or all of which may be considered means for performing this operation.

In an aspect, the first OFDM symbol has an offset of 0, the second OFDM symbol has an offset of 6, the third OFDM symbol has an offset of 3, the fourth OFDM symbol has an offset of 9, the fifth OFDM symbol has an offset of 1, the sixth OFDM symbol has an offset of 7, the seventh OFDM symbol has an offset of 4, the eighth OFDM symbol has an offset of 10, the ninth OFDM symbol has an offset of 2, the tenth OFDM symbol has an offset of 8, the eleventh OFDM symbol has an offset of 5, and the twelfth OFDM symbol has an offset of 11.

In an aspect, the first subset of frequency resources, the second subset of frequency resources, the third subset of frequency resources, the fourth subset of frequency resources, the fifth subset of frequency resources, the sixth subset of frequency resources, the seventh subset of frequency resources, the eighth subset of frequency resources, the ninth subset of frequency resources, the tenth subset of frequency resources, the eleventh subset of frequency resources, and the twelfth subset of frequency resources are each configured according to a comb-12 pattern.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A sequence generating entity, comprising:
    a memory; and
    at least one processor communicatively coupled to the memory, the at least one processor configured to:
        factorize a comb size N into prime factors of N, wherein N is the comb size; and
        generate one or more offset sequences for a reference signal for positioning based on one or more sequence lists associated with the prime factors of N and a number of symbols M over which the reference signal is scheduled, wherein M is the number of symbols.

2. The sequence generating entity of claim 1, wherein N=12 and M=12.

3. The sequence generating entity of claim 1, wherein the one or more offset sequences comprises an offset sequence of {0, 6, 3, 9, 1, 7, 4, 10, 2, 8, 5, 11}.

4. The sequence generating entity of claim 1, wherein the at least one processor being configured to factorize the comb size N and generate the one or more offset sequences comprises the at least one processor being configured to:
    generate one or more unique prime lists based on the comb size N, each prime list comprising a list of prime factors of N; and
    generate the one or more offset sequences corresponding to the one or more unique prime lists.

5. The sequence generating entity of claim 4, wherein the at least one processor being configured to generate the one or more offset sequences corresponding to the one or more unique prime lists comprises, for each prime list of the one or more unique prime lists, the at least one processor being configured to:
    generate an offset sequence corresponding to the prime list;
    prune or extending the offset sequence to a sequence length of M; and
    add the offset sequence to a set of offset sequences, the set of offset sequences being the one or more offset sequences.

6. The sequence generating entity of claim 4, wherein:
    the at least one processor being configured to factorize the comb size N and generate the one or more offset sequences comprises the at least one processor being configured to perform a post process based on the one or more offset sequences corresponding to the one or more unique prime lists, and
    the at least one processor being configured to perform the post process comprises the at least one processor being configured to:
        prune the one or more offset sequences to a unique set of offset sequences; and/or
        generate one or more additional offset sequences from the one or more offset sequences.

7. The sequence generating entity of claim 6, wherein the at least one processor being configured to generate the one or more additional offset sequences comprises the at least one processor being configured to:
    generate the one or more additional offset sequences by tone shifting resource elements of the reference signal of the one or more offset sequences in a frequency domain; and/or
    generate the one or more additional offset sequences by symbol shifting the resource elements of the reference signal of the one or more offset sequences in a time domain.

8. The sequence generating entity of claim 1, wherein the at least one processor is further configured to:
    initialize a first sequence value of the one or more offset sequences for the reference signal for positioning; and
    iteratively generate remaining sequence values of the one or more offset sequences based on a step size S, the comb size N, and the number of symbols M of the reference signal, wherein S is the step size.

9. The sequence generating entity of claim 8, wherein:
    based on an initial value K being provided, the at least one processor is configured to initialize the first sequence value to the initial value K, wherein K is the initial value, and
    based on the initial value K not being provided, the at least one processor is configured to initialize the first sequence value to a default value or assign a random integer value to the first sequence value.

10. The sequence generating entity of claim 8, wherein the at least one processor being configured to iteratively generate the remaining sequence values of the one or more offset sequences comprises the at least one processor being configured to:
    set $O_m = \mod(S + O_{m-1}, N)$ for each remaining sequence value $O_m$, m=1 to M−1.

11. The sequence generating entity of claim 1, wherein the sequence generating entity is a base station configured to transmit the reference signal for positioning to one or more user equipments (UEs).

12. A method of wireless communication performed by a sequence generating entity, the method comprising:
    factorizing a comb size N into prime factors of N, wherein N is the comb size; and
    generating one or more offset sequences for a reference signal for positioning based on one or more sequence lists associated with the prime factors of N and a number of symbols M over which the reference signal is scheduled, wherein M is the number of symbols.

13. The method of claim 12, wherein N=12 and M=12.

14. The method of claim 12, wherein the one or more offset sequences comprises an offset sequence of {0, 6, 3, 9, 1, 7, 4, 10, 2, 8, 5, 11}.

15. The method of claim 12, wherein each of the one or more sequence lists associated with a first prime factor of the prime factors comprises one or more prime sequences, each prime sequence having a length equal to the first prime factor.

16. The method of claim 12, wherein factorizing the comb size N and generating the one or more offset sequences comprises:
    generating one or more unique prime lists based on the comb size N, each prime list comprising a list of prime factors of N; and
    generating the one or more offset sequences corresponding to the one or more unique prime lists.

17. The method of claim 16, wherein generating the one or more offset sequences corresponding to the one or more unique prime lists comprises, for each prime list of the one or more unique prime lists:
generating an offset sequence corresponding to the prime list;
pruning or extending the offset sequence to a sequence length of M; and
adding the offset sequence to a set of offset sequences, the set of offset sequences being the one or more offset sequences.

18. The method of claim 16, wherein:
factorizing the comb size N and generating the one or more offset sequences comprises performing a post process based on the one or more offset sequences corresponding to the one or more unique prime lists, and
performing the post process comprises:
pruning the one or more offset sequences to a unique set of offset sequences; and/or
generating one or more additional offset sequences from the one or more offset sequences.

19. The method of claim 18, wherein generating the one or more additional offset sequences comprises:
generating the one or more additional offset sequences by tone shifting resource elements of the reference signal of the one or more offset sequences in a frequency domain; and/or
generating the one or more additional offset sequences by symbol shifting the resource elements of the reference signal of the one or more offset sequences in a time domain.

20. The method of claim 12, further comprising:
initializing a first sequence value of the one or more offset sequences for the reference signal for positioning; and
iteratively generating remaining sequence values of the one or more offset sequences based on a step size S, the comb size N, and the number of symbols M of the reference signal, wherein S is the step size.

21. The method of claim 20, wherein:
based on an initial value K being provided, the first sequence value is initialized to the initial value K, wherein K is the initial value, and
based on the initial value K not being provided, the first sequence value is initialized to a default value or is assigned a random integer value.

22. The method of claim 20, wherein iteratively generating the remaining sequence values of the one or more offset sequences comprises:
setting $O_m = \mod(S + O_{m-1}, N)$ for each remaining sequence value $O_m$, m=1 to M−1.

23. The method of claim 12, wherein the sequence generating entity is a base station configured to transmit the reference signal for positioning to one or more user equipments (UEs).

24. The method of claim 23, wherein:
multiple offset sequences are generated, and
the method further comprises:
choosing one of the multiple offset sequences for use in transmission of the reference signal for positioning; and
informing the one or more UEs regarding the offset sequence being used.

25. The method of claim 12, wherein the sequence generating entity is a user equipment (UE).

26. The method of claim 12, wherein the sequence generating entity is a core network component.

27. A method for wireless communication at a base station, comprising:
identifying a reference signal configuration for transmission of a downlink positioning reference signal (DL-PRS) for positioning to a user equipment (UE), the reference signal configuration providing reference signal resources within at least a first orthogonal frequency division multiplexing (OFDM) symbol, a second OFDM symbol, a third OFDM symbol, a fourth OFDM symbol, a fifth OFDM symbol, a sixth OFDM symbol, a seventh OFDM symbol, an eighth OFDM symbol, a ninth OFDM symbol, a tenth OFDM symbol, an eleventh OFDM symbol, and a twelfth OFDM symbol; and
transmitting to the UE, based at least in part on the reference signal configuration, a first portion of the DL-PRS on a first subset of frequency resources of the first OFDM symbol, a second portion of the DL-PRS on a second subset of frequency resources of the second OFDM symbol, a third portion of the DL-PRS on a third subset of frequency resources of the third OFDM symbol, a fourth portion of the DL-PRS on a fourth subset of frequency resources of the fourth OFDM symbol, a fifth portion of the DL-PRS on a fifth subset of frequency resources of the fifth OFDM symbol, a sixth portion of the DL-PRS on a sixth subset of frequency resources of the sixth OFDM symbol, a seventh portion of the DL-PRS on a seventh subset of frequency resources of the seventh OFDM symbol, an eighth portion of the DL-PRS on an eighth subset of frequency resources of the eighth OFDM symbol, a ninth portion of the DL-PRS on a ninth subset of frequency resources of the ninth OFDM symbol, a tenth portion of the DL-PRS on a tenth subset of frequency resources of the tenth OFDM symbol, an eleventh portion of the DL-PRS on an eleventh subset of frequency resources of the eleventh OFDM symbol, and a twelfth portion of the DL-PRS on a twelfth subset of frequency resources of the twelfth OFDM symbol,
wherein the first subset of frequency resources, the second subset of frequency resources, the third subset of frequency resources, the fourth subset of frequency resources, the fifth subset of frequency resources, the sixth subset of frequency resources, the seventh subset of frequency resources, the eighth subset of frequency resources, the ninth subset of frequency resources, the tenth subset of frequency resources, the eleventh subset of frequency resources, and the twelfth subset of frequency resources do not overlap in a frequency domain.

28. The method of claim 27, wherein:
the first OFDM symbol has an offset of 0,
the second OFDM symbol has an offset of 6,
the third OFDM symbol has an offset of 3,
the fourth OFDM symbol has an offset of 9,
the fifth OFDM symbol has an offset of 1,
the sixth OFDM symbol has an offset of 7,
the seventh OFDM symbol has an offset of 4,
the eighth OFDM symbol has an offset of 10,
the ninth OFDM symbol has an offset of 2,
the tenth OFDM symbol has an offset of 8,
the eleventh OFDM symbol has an offset of 5, and
the twelfth OFDM symbol has an offset of 11.

29. The method of claim 27, wherein the first subset of frequency resources, the second subset of frequency resources, the third subset of frequency resources, the fourth subset of frequency resources, the fifth subset of frequency resources, the sixth subset of frequency resources, the seventh subset of frequency resources, the eighth subset of frequency resources, the ninth subset of frequency resources, the tenth subset of frequency resources, the eleventh subset of frequency resources, and the twelfth subset of frequency resources are each configured according to a comb-12 pattern.

30. A base station, comprising:
    a memory;
    at least one transceiver; and
    at least one processor communicatively coupled to the memory and the at least one transceiver, the at least one processor configured to:
        identify a reference signal configuration for transmission of a downlink positioning reference signal (DL-PRS) to a user equipment (UE), the reference signal configuration providing reference signal resources within at least a first orthogonal frequency division multiplexing (OFDM) symbol, a second OFDM symbol, a third OFDM symbol, a fourth OFDM symbol, a fifth OFDM symbol, a sixth OFDM symbol, a seventh OFDM symbol, an eighth OFDM symbol, a ninth OFDM symbol, a tenth OFDM symbol, an eleventh OFDM symbol, and a twelfth OFDM symbol; and
        cause the at least one transceiver to transmit, to the UE, based at least in part on the reference signal configuration, a first portion of the DL-PRS on a first subset of frequency resources of the first OFDM symbol, a second portion of the DL-PRS on a second subset of frequency resources of the second OFDM symbol, a third portion of the DL-PRS on a third subset of frequency resources of the third OFDM symbol, a fourth portion of the DL-PRS on a fourth subset of frequency resources of the fourth OFDM symbol, a fifth portion of the DL-PRS on a fifth subset of frequency resources of the fifth OFDM symbol, a sixth portion of the DL-PRS on a sixth subset of frequency resources of the sixth OFDM symbol, a seventh portion of the DL-PRS on a seventh subset of frequency resources of the seventh OFDM symbol, an eighth portion of the DL-PRS on an eighth subset of frequency resources of the eighth OFDM symbol, a ninth portion of the DL-PRS on a ninth subset of frequency resources of the ninth OFDM symbol, a tenth portion of the DL-PRS on a tenth subset of frequency resources of the tenth OFDM symbol, an eleventh portion of the DL-PRS on an eleventh subset of frequency resources of the eleventh OFDM symbol, and a twelfth portion of the DL-PRS on a twelfth subset of frequency resources of the twelfth OFDM symbol,
    wherein the first subset of frequency resources, the second subset of frequency resources, the third subset of frequency resources, the fourth subset of frequency resources, the fifth subset of frequency resources, the sixth subset of frequency resources, the seventh subset of frequency resources, the eighth subset of frequency resources, the ninth subset of frequency resources, the tenth subset of frequency resources, the eleventh subset of frequency resources, and the twelfth subset of frequency resources do not overlap in a frequency domain.

* * * * *